US008825767B2

(12) United States Patent
Sivavakeesar

(10) Patent No.: US 8,825,767 B2
(45) Date of Patent: Sep. 2, 2014

(54) SCALABLE SECURE WIRELESS INTERACTION ENABLING METHODS, SYSTEM AND FRAMEWORK

(75) Inventor: Sivapathalingham Sivavakeesar, Wokingham (GB)

(73) Assignee: Sivapathalingham Sivavakeesar, Milton Keynes (GB)

( * ) Notice: Subject to any disclaimer, the term of this patent is extended or adjusted under 35 U.S.C. 154(b) by 820 days.

(21) Appl. No.: 12/897,817

(22) Filed: Oct. 5, 2010

(65) Prior Publication Data

US 2012/0084364 A1    Apr. 5, 2012

(51) Int. Cl.
| | |
|---|---|
| *G06F 15/16* | (2006.01) |
| *H04L 12/18* | (2006.01) |
| *H04L 12/58* | (2006.01) |
| *H04W 4/00* | (2009.01) |
| *H04W 12/06* | (2009.01) |
| *H04W 84/18* | (2009.01) |
| *H04W 8/18* | (2009.01) |
| *H04W 88/06* | (2009.01) |
| *H04W 92/18* | (2009.01) |

(52) U.S. Cl.
CPC ............ *H04W 12/06* (2013.01); *H04L 12/1818* (2013.01); *H04L 51/14* (2013.01); *H04W 4/003* (2013.01); *H04W 84/18* (2013.01); *H04W 8/18* (2013.01); *H04W 88/06* (2013.01); *H04W 92/18* (2013.01); *H04L 51/20* (2013.01)
USPC .......................................... 709/205; 370/328

(58) Field of Classification Search
CPC ...................................................... H04L 67/104
USPC ............................................ 709/205; 370/328
See application file for complete search history.

(56) References Cited

U.S. PATENT DOCUMENTS

| | | | | |
|---|---|---|---|---|
| 7,757,076 | B2 * | 7/2010 | Stewart et al. | 713/156 |
| 2006/0126614 | A1 * | 6/2006 | Logan | 370/389 |
| 2010/0208662 | A1 * | 8/2010 | Fuste Vilella et al. | 370/328 |
| 2011/0019587 | A1 * | 1/2011 | Wang | 370/254 |

* cited by examiner

*Primary Examiner* — Glenford Madamba

(57) ABSTRACT

The present invention proposes methodologies, a system and a secure spontaneous collaboration framework along with a suitable application and services suite for enabling new paradigm of social networking among users of handheld devices by bridging gab between infra-structure-based networks and mobile ad hoc networks. While supporting three different operating modes for the spontaneous collaboration that suits the user preference and network conditions, the proposed solutions hide the complexity of finding the right peer/device for spontaneous collaboration, self-organizing the network to be formed on-demand, mitigating the security threat, being aware of user mobility for service continuity across wide variety of networks. Binding a given user to user's handheld device and specifying the number of applications/services enabling spontaneous collaborations that a given user is interested in are possible through user-profile creations. By taking a holistic view, the proposed solutions enable very practical, scalable, secure and economical spontaneous collaborations.

29 Claims, 12 Drawing Sheets

Interested Sex: Male O female O
Age: _____ (dropdown list)
Orientation: Straight O Gay O Lesbian O Bisexual O
Looking for: Relationship O Fun O Friendship O
Does ethnic origin matter? Yes O No O
If YES, ethnic group: _____ (dropdown list)
Does Religious view matter? Yes O No O
If YES, religious class: _____ (dropdown list)
Is age a deciding factor? Yes O No O
If YES, required age: min[ ] ~ max[ ]
Is Colour a deciding factor? Yes O No O
If YES, required colour: _____ (dropdown list)
Does Nationality matter? Yes O No O
If YES, Nationality: _____ (drop down list)
Is ethnicity a deciding factor? Yes O No O
If YES, Ethnicity: _____ (dropdown list)
Does language matter? Yes O No O
If YES, Language: _____ (dropdown list)
Is Height a deciding factor? Yes O No O
If YES, required Height: min[ ] ~ max[ ]
Is Weight a deciding factor? Yes O No O
If YES, required Weight: min[ ] ~ max[ ]
Does Profession matter? Yes O No O
If YES, Profession: _____ (dropdown list)
Priority of this Application: ___ (dropdown list of integers)

Activate

Is the age a deciding factor: No/Yes
If YES, Age (range): min[ ] ~ max[ ]
Does ethnic origin matter: No/Yes
If YES, ethnic origin: _____ (dropdown list)
Does Religious Views matter: No/Yes
If YES, Religion: _____ (dropdown list)
Does gender matter: No/Yes
If YES, gender: _____ (dropdown list)
Does country of birth matter: No/Yes
If YES, country of birth: _____ (dropdown list)
Does country of residence matter: No/Yes
If YES, country of residence: _____ (dropdown list)
Is the mother tongue a deciding criterion: No/Yes
If YES, mother tongue: _____ (dropdown list)
Does the occupation matter: No/Yes
If YES, occupation: _____ (dropdown list)
Is the employed industry a deciding factor: No/Yes
If YES, employed industry: _____ (dropdown list)
Priority of this Application: ___ (dropdown list of integers)

Activate

| Version | Payload type | Profile ID | Source Identifier | Service List (own services provided) | Time Availability | Mode Preferred | Online Status | Network ID | Service ID | How many more peers Needed |

| Version | Payload type | Profile ID | Source identifier | Time availability | Online Status |

| Version | Payload Type | Profile ID of the Source | Profile ID of the Destination | Query/Response |

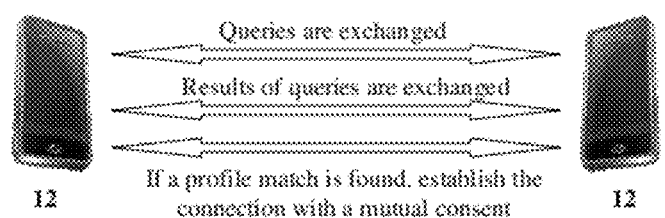

Queries are exchanged

Results of queries are exchanged

If a profile match is found, establish the connection with a mutual consent 12                                                                12

Fig. 13

SCALABLE SECURE WIRELESS INTERACTION ENABLING METHODS, SYSTEM AND FRAMEWORK

TECHNICAL FIELD

The present invention relates to methods and a complete system/framework for enabling new paradigm of secure wireless social networking.

BACKGROUND

The mobile communication is currently witnessing the fusion of Personal Digital Assistants (PDAs) and mobile phones into smart phones with increasing diversity in their capabilities. With hardware becoming increasingly cheaper, handheld devices for computing and communication will become faster, smaller, more accessible, more affordable, and easier to use. In addition, new short-range radio communication standards such as ZigBee, WiMedia Ultra Wide Band (UWB) and WiFi-Direct are emerging while promising hundreds of megabits per second data rate with low power consumption—hence are more suitable for mobile handsets. This leads to a widespread availability of mobile handheld devices that are equipped with one or plurality of such short-range radio standards as WiFi (IEEE 802.11 and its variants), Bluetooth (IEEE 802.15.1), ZigBee (IEEE 802.15.4), Infrared, WiMedia UWB and the like. Hence, a smart computing and communication space filled with multitude of heterogeneous handheld devices in the move together with fixed powerful devices allowing cyber-foraging should be the direct outcome of these technological advancements, and where heterogeneous devices are able to get together and form a network spontaneously on demand as long as they are within each other's radio range. This rapid proliferation can stimulate a general trend towards extending Peer-to-Peer (P2P) characteristics to wireless environments. With this, dynamic composition of network is possible on-the-fly and this will improve human interactions and collaborations.

This dynamic network formation that encompasses heterogeneous devices greatly benefits from the ability to rapidly create, deploy and manage services, applications and protocols in response to user demands. In such environments, the execution of a complex task does not necessarily make use of preconfigured devices or networks, but requires instead the selection of suitable computing elements on-the-fly, based on the task requirements and device characteristics (i.e., networking-on-demand or task/user-centric networking). This is the "anyone, anywhere, anytime" paradigm of intelligent overlay community establishment that uses mobile ad hoc networking (MANET) as the basic underlying technology. In this new communication paradigm applications and the services are not ported onto a pre-existing network, but where the network itself grows out of the applications and the services which end users want. This approach enables users to view the network in the manner most appropriate to them and their requirements. This can push the boundaries of today's handheld devise users in terms of their ability to form different networks on demand using short-range communication capabilities in an ad hoc way while being attached to the original conventional mobile/wireless systems namely 3G+, 4G, WiMAX, and WiFi. However, this potential has not been realized yet technically and commercially due to the following four fundamental reasons:

i) the first important problem is associated with the security as this type of spontaneous collaboration often inevitably demands communicating with total strangers, and this discourages or prevents users of devices being equipped with one or more short-range radio communication technologies from being connected to each other without using any pre-existing infra-structure in an ad hoc way (e.g., threat of Bluejacking in the case of Bluetooth), ii) the second reason attributes to the unavailability of a unified framework allowing interaction among devices being equipped with different short-range radio technologies in a cohesive and collective way by making them understand each other, iii) the third reason is the unavailability of killer applications, and iv) the fourth reason attributes to the unavailability of a mechanism that can bridge a gap between a pure ad-hoc network mainly employing short-range radio standards and any fixed network.

The present invention seeks to overcome the above drawbacks, and particularly seeks to provide a unified solution for easy and economical spontaneous user collaborative experiences.

To aid further understanding of the present invention, a brief disclosure of various types of heterogeneous handheld devices and on-demand networking principles are now provided. Each handheld device is expected by the present invention to have communication and computing capabilities, and hence sometimes referred to as a handheld mobile communication and computing device or heterogeneous device by the present invention. However, in terms of processing and communication capabilities and the internal memory footprint being possessed, any heterogeneous device can be classified as either a "thick" or a "thin" device. As the names imply, a "thick" device possesses huge processing power while enjoying amble internal memory, whereas a "thin" device is characterised by having very low processing power and very limited internal memory footprint. In addition, there exists two main categories of networks depending on how such networks are formed;

i) Mobile Ad hoc Network (MANET): networks being able to operate in standalone fashion without necessitating any reliance on any fixed infrastructure.

ii) Infra-Structure-based Network: if the formed network heavily requisites any type of dependence on any pre-existing infra-structure.

By the term ad-hoc network, the patent means the formation of a network on-the-fly without relying upon any infra-structure-based network, i.e., using any fixed databases or centralised server functionalities. Mobile Ad hoc NETworks (MANETs) are the typical example of this category. On the other hand, there is a different on-demand network formation that makes use of ad hoc networking principles while using any fixed infra-structure. Hence, it is possible that devices forming such networks on demand may belong to different physical networks at the same time, for e.g., computers belonging to Ethernet or WLAN, or mobile nodes belonging to GSM, 2.5G, 3G, and 4G cellular networks and relies on some centralised resources. In this respect it needs to be explained at this juncture that the networks thus formed on demand may consist of fixed and mobile devices. Such networks are normally referred to as hybrid networks. However, in this document, the term hybrid network means the type of network consisting of any mobile and/or fixed devices that uses predominantly the short-range radio technologies for communicating with each other (i.e., for user traffic) and thus is standalone from this perspectives although it sporadically interacts with the centralised server and the associated databases in order to achieve various optional management and control functionalities (for instance enabling mutual authentication and non-repudiation—a necessary feature to ensure secure spontaneous interactions among total strangers, resolving duplicate address detection, performing availability predictions and ensuring session continuity when handing over from a hybrid/ad-hoc network to a conventional infra-structure-based network (e.g., cellular or Internet) and vice-versa).

There exists a multitude of prior works (e.g., patents namely WO 2007/084807 A1, WO 2007/040864 A3, WO 2005/083956 A1, US 2008/0108437 A1, US 2007/0197160 A1 and US 2004/0087274 A1) proposing various solutions to the same research problem of enabling ad hoc network collaborations this patent tries to address. However, in general, other solutions appearing in the literature have various shortcomings and deficiencies such as security threats, needing special hardwired solutions, privacy, scalability, and interoperability issues and more importantly the new user experience that is possible with an introduction of novel application and services suit as proposed in this patent.

For instance, patent WO 2007/084807 A1 envisages the formation of a medical ad hoc network where each peer device is hardwired and includes a special hardware called Body-Coupled Communication (BCC) interface for the purpose of authenticating a user. According to that piece of work, joining an existing network requires the user to touches the new device and any device belonging to the established network; in contrary, our proposed framework does not require any such behaviour by any user. Further, patent WO 2007/084807 A1 does not propose any special auto-configuration method; instead, it uses Bluetooth-based connection establishment and mutual authentication which requires manual intervention at least in the first instance. This further precludes any interaction among total strangers without requiring a face-to-face meeting. Further this ad hoc networking is made possible only among purpose built special devices whereas according to the proposed solutions of our patent the intention is to make such spontaneous collaboration possible among any generic handheld devices as long as they have any short-range wireless transceiver and a mechanism to connect to the centralized server intermittently either before or during the spontaneous collaborations.

Patent WO 2007/040864 A3 envisages an ad hoc network where there exists a clear distinction of devices in terms of the functionalities expected from each of them and accordingly there exists one master device (i.e., a controller) and a plurality of slave devices. With appropriate assignment of priorities, the master device controls the membership of slaves as a way to conserve battery energy of devices. In contrary, the proposed solution of our patent is a complete framework and does not work on the master-slave paradigm.

Patent WO 2005/083956 A1 proposes client-server based ad hoc collaborations where the service discovery is reactive as opposed to being proactive as proposed in our patent and the discovering client needs to forward the found information to the central server for it to keep all the client information and the topological map in a client database. The server is mandatory and also controls the discovery schedule detailing which client should do next. There are instances when primary clients can discover others but incapable of being discovered. A similar solution is presented in US 2004-0087274 A1. On the other hand, in our proposed framework, the centralized server optionally exists—but its existence allows namely mutual authentication, session continuity, user availability predictions and duplicate address resolution in addition to bringing other benefits. However, our proposed methodologies, and system framework still allows fully distributed operation (it is called semi-distributed) if all the handheld devices have up-to-date information in their local database possibly by getting the local database synchronized with the centralized one prior to the spontaneous collaboration.

Patent US 2008/0108437 A1 proposes a method to facilitate multi-user gaming via an ad hoc network. This is not scalable as this scheme envisages the exchange of the description of the plurality of games among the participating players. On the other hand, our proposed framework uses special IDs such as Service IDs and Game IDs and this helps the service discovery protocol to find the right players quickly, and in order to make sure that different users use the same ID for a given game, it needs to be registered first in the centralized server by the game introducer.

Patent US 2007/0197160 A1 presents a low cost apparatus and method to broadcast music in an ad hoc network. It hence requires special hardware for this purpose, and has one application in mind On the other hand, our methodologies and the system framework enable any handheld device users/owners to interact in multiple ways using a variety of applications—and some of them are novel. Our proposal ensures mutual authentication and non-repudiation, and hence allows any user to interact with any stranger as long as the proposed system framework and methodologies confirms the authenticity of users.

In essence, the framework enabling secure spontaneous interaction proposed in our patent has unique features that make the inventions easily standout from the prior art because of the way the proposal tries to bridge a gab between MANETS and any fixed infra-structure (i.e., centralised server and associated database) and such features are made possible with sporadic interaction with the centralised server/databases.

It should also be noted here that while there exists various solutions to the problem of ad hoc network interaction, there has been no proper attempt to apply it to the same research problem in order to enable secure auto-configuration and subsequent secure ad hoc collaboration among total strangers being possible through a novel application suite along with an ability to maintain session continuity when users move a part substantially that they go out-of-range of each other in the manner proposed here. In addition to being a scalable and very pragmatic commercial solution because of the way the ad hoc network makes use of fixed centralised server and the associated database to assure total strangers to interact with each other with no fear, it brings in additional benefits such as being applicable to any application and services (i.e., not tied to a particular application), assuring security among sporadic strangers without requiring them to have any interaction prior to any ad hoc collaboration, being applicable at a global level without requiring any special hardware or hardwired mechanism, assuring session continuity, ensuring user privacies and many as slightly discussed previously.

DISCLOSURE OF THE INVENTION

According to the first aspect of the present invention there is provided a secure spontaneous collaboration system comprising:

i) two or more existing handheld mobile communication and computing devices (handheld device for short) having the necessary software/hardware capabilities—each handheld device installing and running a purpose-built client software module (client module for short);

ii) an application and services suite that contains applications/services that enable spontaneous collaboration among users of the said handheld devices—each handheld device installing and running the said application and services suite;

iii) a centralised server maintaining one or more centralised database, and a server application running continuously, wherein one functionality of the said databases is to maintain details of standard said applications/services that enable spontaneous collaboration among users of the said handheld devices via the communication interface of first type and user-specific profile information pertaining to various applications/services and user groups/forums a user is interested in; and, iv) a communication network which allows the said handheld device to maintain necessary communication with the said server via a communication interface of second type;

wherein the said client module employs an operating mode selection procedure to choose the appropriate operating mode out of three different modes enabling any spontaneous collaboration among two or more of the said handheld devices via the said communication interface of first type and the three different operating modes including:

a) Fully distributed approach as in a pure MANET that allows little interactions with any existing infra-structure in priory or during any spontaneous collaboration;

b) Semi-distributed approach that allows communication with any existing infra-structure (i.e., the said centralised server and associated databases) mainly prior to any spontaneous collaboration; and, c) Centralised approach that allows intermittent communication with any existing infra-structure (i.e., any centralised server and associated databases) mainly during any spontaneous collaboration.

Preferably the said secure spontaneous collaboration system, wherein the said handheld device expects to maintain a local database which is an exact replica of the said centralised database, and this requires periodic synchronisation of the said local database with the said centralised database prior to any spontaneous collaboration attempt, if possible.

It is preferred that the said secure spontaneous collaboration system, wherein the said operating mode selection procedure of the said client module for its operation comprising the steps of:

1) Sniffing all the available radio channels being used to provide the communication interface of first type and measuring the congestion-level of the least congested channel;

2) deciding whether the current congestion-level is suitable for the fully distributed mode that has no reliance on any infra-structure network, and if so, choosing the fully distributed mode;

3) on the other hand, if the congestion level is too high for the fully distributed mode further checking whether the congestion level is suitable for at least the semi-distributed or centralised modes and if the said local database in the handheld device is up-to-date with the said centralised database, choosing semi-distributed mode or otherwise if infra-structure-based connection is preferred by the user, then choosing the centralised mode; and, 4) on the other hand, the congestion is too high for any mode to operate satisfactorily aborting the operation, wherein the said operating mode selection procedure adopts one of three modes of operation to suit the handheld device capabilities, user preferences in terms of connecting to any infra-structure-based network and dynamic load conditions of the network to be formed.

Preferably the said secure spontaneous collaboration system, wherein each user of a handheld device needs to create and maintain one or plurality of different categories of profiles per user in the said centralised database or the said local database at the discretion of each user depending on the multitude of the said applications/services the user is interested in and supported by the said client module for the purpose of uniquely identifying either a particular user or a handheld device that tries to spontaneously collaborate with one another, and this process requires:

1) creation, activation and maintenance by every user of the mandatory main profile and one or a multitude of optional profiles per each of the said applications/services a user is interested in;

2) optional introduction of new spontaneous collaboration enabling application/service, special interest groups/forums, if any, to the said application and services suite while specifying the selection criteria and configuration details, if any, and subsequent creation, activation and maintenance of an optional profile per each application/service introduced by the user;

3) storing of all profiles either centrally or locally in a profile database/repository depending on the mode of operations chosen for the spontaneous collaboration by the said operating mode selection procedure; Wherein a successful main user profile creation and activation assigns a unique alphanumeric identifier called Profile-ID to each user, and expects the user to set his/her own login details by specifying the preferred username and password, and the said Profile-ID is used by the said server application and the said client module to uniquely bind and identify each user and the said handheld device being used.

It is preferred that the said secure spontaneous collaboration system, wherein the said client module needs to be installed and activated on any of the said handheld devices and the activation is possible by signing in using the login credentials such as the Profile-ID, username and password of a user when prompted, wherein the said activation will bind a given user to a given handheld device.

Preferably the said secure spontaneous collaboration system, wherein the communication interface of first type is any of the short-range radio communication technologies that are both available to date such as WiFi and WiFi-direct (i.e., different variants of IEEE 802.11), Bluetooth (i.e., different variants of IEEE 802.15.1), ZigBee (i.e., different variants of IEEE 802.15.4), WiMedia UWB, Infra Red (IR) and any similar future technologies and chooses the right one on-the-fly depending on channel quality conditions.

It is preferred that the said secure spontaneous collaboration system, wherein the communication interface of second type is the main air interface of existing and/or future cellular/wireless technologies such as GPRS, 3G, LTE/LTE-A, WiMAX, WLAN and the like.

Preferably the said secure spontaneous collaboration system, wherein the synchronisation of the said local database with the said centralised database is possible, after activating the said client module that is to run in the said handheld device using the said login credentials.

It is preferred that the said secure spontaneous collaboration system, wherein the said system employs various service/peer discovery protocols depending on the operating mode chosen for the possible spontaneous collaboration by the client module together with the network composition and auto-configuration protocol, and any of the said protocol running in each of the said handheld devices comprising the steps of:

1) initiating periodic (e.g., HELLO) packet dissemination with the Profile-ID at regular intervals if the user of the said handheld device maintains an active profile as a way to advertise proactively the list of said applications/services the user provides and is interested in, while seeking relevant peers (i.e., service providers) for active spontaneous collaborations; and, 2) listening to neighbouring devices' regular packet (e.g., HELLO) transmissions and on receiving a (e.g., HELLO) packet from the neighbouring user device the said client module running locally in a handheld device performing:
   a) authenticating the originator, if possible, and on successful authentication, checking to see whether any of the said application/services provided by the originator is interesting;
   b) on seeing the said interesting applications/services of the said application and service suite, sending back positive response;
   c) checking to see whether the task-centric network is already established for each of the said application/service being interested in, and if it is the case, joining one or plurality of such networks at the user's discretion; and,
   d) On seeing that no relevant task-centric network is already formed, establishing and auto-configuring the necessary task-centric networks per the said application/service being interested in at the user's discretion;

wherein the said service, peer and device discovery protocols of the said system enable peers to find each other proactively for a possible spontaneous collaboration when peers are located within each other's radio coverage (i.e., range) through periodic (e.g., HELLO) packet dissemination and on successfully authenticated at the reception of the said regular (i.e., HELLO) packet, the service discovery from a given said application/service perspective is accomplished when both the sender and the receiver are interested in particular applications/services of the said application and services suite.

Preferably the said secure spontaneous collaboration system, wherein the said client module is robust enough to enable spontaneous collaboration without requiring each handheld device user to connect to the said centralised server and the associated databases, wherein by getting each user to create and maintain active profiles in the said local database and by subsequently forming a pure ad-hoc network, the said system enables users to spontaneously collaborate via the communication interface of first type using some standard applications/services belonging to the said application and services suite.

It is preferred that the said secure spontaneous collaboration system, wherein the said client module, said server application and the said database assign/use a globally unique identifier called service identifier in order to uniquely identify each service/application/group/forum, belonging to the said application and services suite, wherein the said peer and device discovery protocols use the same service identifiers during the peer/device/service discovery, wherein the usage of the said service identifiers enables lightweight operation of the said spontaneous collaborating operation in semi-distributed and centralised mode of operations.

Preferably the said secure spontaneous collaboration system, wherein the said service, peer and device discovery protocols allow each user to specify in the said periodic (e.g., HELLO) packets as to how long the given user will be available for a spontaneous collaboration, and such information will be used in the peer discovery.

It is preferred that the said secure spontaneous collaboration system, wherein the said service, peer and device discovery protocols can specify the operating mode preferred for the spontaneous collaboration such that the said service, peer and device discovery mechanisms use mode of operation preferred for the spontaneous collaboration as one of the criteria in the discovery process.

Preferably the said secure spontaneous collaboration system, wherein the said system supports two-way authentication and non-repudiation by getting the said server, server application and said centralised database to take an extra functionality of a public key infrastructure, wherein the said server application assigns a public and private (i.e., asymmetric) keys per user on successful creation and activation of the main profile, stores such asymmetric key information in the said centralised database on a per user basis along with each user's complete user-specific information and informs each user of the private key assigned in order to ensure secure spontaneous collaborations among sporadic strangers.

It is preferred that the said secure spontaneous collaboration system, wherein the said service, peer and device discovery protocols insert the required asymmetric keys in the said periodic (e.g., HELLO) packets in order to aid mutual user authentication.

Preferably the said secure spontaneous collaboration system, wherein once the said client module running in a user device has sniffed its immediate neighbourhood through any service, peer and device discovery mechanism and the said client module is configured to operate in manual mode, the said client module will list down the details in the user interface of the handheld device being used for the spontaneous collaboration regarding the various types of the said application/services or special groups/forums that the user is interested in as specified in user's variety of active profiles and hence are available for the user to choose and manually invoke any of them for the purpose of initiating a spontaneous collaboration.

It is preferred that the said secure spontaneous collaboration system, wherein when the said client module has listed down the details in the user interface of the handheld device being used for the spontaneous collaboration regarding the various types of the said application/services or special groups/forums that the user is interested in as specified in user's variety of active profiles and hence being available for the user to choose, the said client module provides the total control to the user in terms of how to list down the said interesting application/services and special forums/groups depending on user sorting preferences.

Preferably the said secure spontaneous collaboration system, wherein the said auto/self-configuration protocol that runs immediately after the service/peer/device discovery, if dynamic network composition of any task-centric network on-the-fly is needed, and the said self-configuration protocol comprising the steps of:

1) getting each successfully self-configured device to disseminate the self-configured (i.e., zeroconf) address in the said periodic (e.g., HELLO) packets; and, 2) getting each newly joined device to assign itself a zeroconf address while minimising any address related conflict after having promiscuously listened to the said periodic (e.g., HELLO) packet dissemination of the neighbouring devices in priory for a constant period, Wherein, by getting a newly joined device to promiscuously listen to the said periodic (e.g., HELLO) packet dissemination by other devices in the neighbourhood for a constant time-period and avoiding self-configuring the address that is being currently used by any other device, duplicate address conflict among two or more handheld devices can be partly resolved.

It is preferred that the said secure spontaneous collaboration system, wherein when it is possible for the said auto/self-configuration protocol to have intermittent interaction with the said centralised database, the duplicate address conflict among two or more handheld devices is further resolved using timer-based usage wherein the said auto/self-configuration protocol running on each device has to register its self-configured address with the said central database along with the time-stamp at the time of the self-configured address being first used and whenever address conflict occurs, it will be resolved by one device contacting the said central database for a look up and resolving it based on the duration a given address is used by any device.

Preferably the said secure spontaneous collaboration system, wherein the said auto/self-configuration protocol can still employ the timer-based address conflict resolution when the said client module has chosen the said fully distributed mode for the spontaneous collaboration as well with the use of query/response mechanism between the parties to the address conflict or either party and a mediator.

It is preferred that the said secure spontaneous collaboration system, wherein the said auto/self-configuration protocol allows each task-centric network formed on-demand to be identified using a network identifier (e.g., Network ID), which is a combination of a Profile-ID of the network originator and the service identifier (i.e., Service ID).

Preferably the said secure spontaneous collaboration system, wherein the said service, peer and device discovery protocols specify in the said periodic (e.g., HELLO) packets the remaining number of peer users needed to form the required task-centric network.

It is preferred that the said secure spontaneous collaboration system, wherein the system employs a session continuity procedure in order to ensure the session continuity of an on-going multimedia session between two or more of the said handheld devices, wherein the session continuity is ensured from a task-centric ad hoc network formed on-demand to any infra-structure-based network or vice-versa when the said client module adopts either semi-distributed or centralised mode while getting the said centralised server/database to take additional SIP server functionality namely the registration SIP server functionality in priory, and the said session continuity procedure comprising the steps of:

1) checking to see whether there exists one or plurality of infra-structure-based networks;

2) getting the client module running in each participating handheld device of the multimedia session to maintain one SIP stack per user agent for an ad hoc network and another SIP stack per user agent for any infra-structure-based network at the time of session initiation if at least one infra-structure-based network exists in addition to the existence of the ad hoc network, wherein one SIP stack maintained for the ad hoc network is made active whereas the other is made standby/passive;

3) getting both SIP stacks to use the same Call-ID;

4) monitoring the quality of the existing links by liaising with the physical layer of the communication interface of first type being used and performing a seamless handover to any infra-structure-based network using the communication interface of second type and making the passive SIP stack meant for any infra-structure-based network active while making the SIP stack meant for the ad hoc network passive when the signal quality degrades below a threshold:

Wherein, the objective is to let a session that is originated when the users spontaneously collaborate in an ad hoc mode using the communication interface of first type while being within each other's communication range continue using different infra-structure-based network employing the communication interface of second type at the user's discretion even when the users move away from each other.

Preferably the said secure spontaneous collaboration system, wherein the said application and services suite enables any user to create new applications, services and special interest groups/forums facilitating new type of spontaneous collaboration among total strangers located within each other's radio range pertaining to the communication interface of first type, wherein by getting each user to first register his/her new additions (i.e., applications, services and special interest groups/forums) along with special attributes/criteria in the said centralised database that allows unique service identifier (e.g., Service ID) to be assigned to each new addition in order to uniquely and globally identify the new application/service or special interest group/forum being added, maintaining new unique profile per every addition and subsequently updating the local database of the handheld device by getting it synchronised with the centralised database, if possible, the said system enables handheld device users to seek/find appropriate devices, peers and services for new type of spontaneous collaborations as facilitated through the new additions provided peer users maintain one or plurality of active profiles pertaining to the newly added application/service or special interest group/forum.

According to the second aspect of the present invention there is provided a methodology that gets two or more existing handheld mobile communication and computing devices having the necessary hardware and/or software functionalities especially a wireless transceiver supporting a communication interface of first type to take part in spontaneous collaboration among each other and the said methodology further employs an operating mode selection procedure to choose the appropriate operating mode out of three different modes enabling any spontaneous collaboration among two or more of the said handheld devices via the said communication interface of first type and the three different operating modes including:

a) Fully distributed approach as in a pure MANET that allows little interactions with any existing infra-structure in priory or during any spontaneous collaboration;

b) Semi-distributed approach that allows communication with any existing infra-structure (i.e., any centralised server and associated databases) mainly prior to any spontaneous collaboration; and, c) Centralised approach that allows intermittent communication with any existing infra-structure (i.e., any centralised server and associated databases) mainly during any spontaneous collaboration, for its operation in order to enable spontaneous collaboration among users of the said handheld devices mainly using a communication interface of first type both when intermittent communication with any infra-structure-based network is possible and when any reliance on any infra-structure-based network is ruled out and the said operating mode selection procedure prefers periodic synchronisation of the local database maintained in the handheld device by the said methodology with the said centralised database prior to any spontaneous collaboration attempt, if possible.

It is preferred that the said methodology that gets two or more existing handheld devices to take part in spontaneous collaboration, wherein the said operating mode selection procedure comprising the steps of:

1) Sniffing all the available radio channels being used to provide the communication interface of first type and measuring the congestion-level of the least congested channel;

2) deciding whether the current congestion-level is suitable for the fully distributed mode that has no reliance on any infra-structure network, and if so, choosing the fully distributed mode;

3) on the other hand, if the congestion level is too high for the fully distributed mode further checking whether the congestion level is suitable for at least the semi-distributed or centralised modes and if the local database in the handheld device is up-to-date with the said centralised database, choosing semi-distributed mode or otherwise if infra-structure-based connection is preferred by the user, then choosing the centralised mode; and, 4) on the other hand, the congestion is too high for any mode to operate satisfactorily aborting the operation, wherein the said methodology adopts one of three modes of operation to suit the handheld device capabilities, user preferences in terms of connecting to any infra-structure-based network and dynamic load conditions of the network to be formed.

Preferably the said methodology that gets two or more existing handheld devices to take part in spontaneous collaboration and makes the said handheld device being part of a system framework consisting of:

a) the said centralised server maintaining one or more centralised online databases, and a server application running continuously, wherein one functionality of the said databases is to maintain details of standard applications/services that enable spontaneous collaboration among users of the said handheld devices via the communication interface of first type and user-specific profile information pertaining to various applications/services and user groups/forums a user is interested in; and, b) a communication network which allows the said handheld device to maintain necessary communication with the said server via a communication interface of second type.

It is preferred that the said methodology requires each of the said existing handheld mobile communication and computing devices having the necessary hardware and/or software functionalities to install/activate and run a client module, and the said client module incorporates a number of features comprising:

1) a mechanism to create one main or plurality of application specific user profiles;

2) a variety of novel peer user/device and service discovery mechanisms;

3) two-way authentication and non-repudiation mechanism;

4) on-the-fly task-centric network formation and novel self-configuration of the formed network; and, 5) novel session continuity mechanisms;

wherein the full potential of the methodology is realised by getting each user of one of the said handheld devices:

a) to maintain active profiles in a centralised database (referred to mainly as a profile database/repository), if possible, using either a different personal computer or the handheld device that is going to be used to aid spontaneous collaboration wherein such operation assigns user-specific credentials to ensure mutual authentication and non-repudiation at a global-scale among users who can be total strangers to each other in priory to any spontaneous collaboration;

b) to install and to activate the said client module in any handheld device using the said user-specific credentials; and c) to install/run a novel applications and services suite consisting of application/services enabling spontaneous collaborations that the said client module can support;

d) to synchronise the local database with the centralised one prior to any spontaneous collaboration, if possible, Wherein, activating the said client module locally in a handheld device specifies exactly the type of said application/services the user of the given handheld device is interested in and allows the said methodology to find/identify the appropriate peer users for spontaneous collaborations between users of handheld devices and other devices mainly using communication interface of first type as long as the devices are within each other's radio ranges of the short-range communication technologies providing the communication interface of first type preferably by forming and self-configuring on-demand task-centric networks which are:

1) pure standalone ad-hoc networks having no dependence on any infra-structure network and thus is of "anytime, anywhere, anyone" type by mainly employing the communication interface of first type; or 2) hybrid networks allowing intermittent interaction with any centralised server via the said communication interface of second type;

with an ability to maintain session continuity by making proactive session handovers either from the formed on-demand network to any fixed cellular or wireless communication network or from any fixed cellular or wireless communication network to an on-demand task-centric network to be formed.

Preferably the said methodology comprises various service/peer discovery protocols depending on the methodology's operating mode together with the network composition and auto-configuration protocol, and any of the said protocol running in each handheld device comprising the steps of:

1) initiating a periodic (e.g., HELLO) packet dissemination with the Profile-ID at regular intervals if the user of the handheld device maintains an active profile as a way to advertise proactively the list of said application/services the user provides and is interested in, while seeking relevant peers (i.e., service providers) for active spontaneous collaborations; and, 2) listening to neighbouring devices' periodic packet (e.g., HELLO) disseminations and on receiving a periodic (e.g., HELLO) packet from the neighbouring user device the said client module running locally in a handheld device performing:

a) authenticating the originator, if possible, and on successful authentication, checking to see whether any of the services provided by the originator is interesting;

b) on seeing interesting applications/services belonging to the said application and services suite, sending back positive response;

c) checking to see whether the task-centric network is already established for each of the said application/services being interested in, and if it is the case, joining one or plurality of such networks at the user's discretion; and, d) On seeing that no relevant task-centric network is already formed, establishing and auto-configuring the necessary task-centric networks per each of the said application/services being interested in at the user's discretion;

wherein the service, peer and device discovery protocols of the said methodology enable peers to find each other proactively for a possible spontaneous collaboration when peers are located within each other's radio coverage (i.e., range) through periodic (e.g., HELLO) packet dissemination and on successfully authenticated at the reception of the said regular (i.e., HELLO) packet, the service discovery from a given said application/service perspective is accomplished when both the sender and the receiver are interested in particular said applications/services.

It is preferred that the mutual user authentication by the said methodology is possible by getting the said server and associated centralised database to take an extra functionality of a public key infrastructure, wherein it assigns a public and private (i.e., asymmetric) keys per user on successful creation and activation of the main profile by each user, to store such asymmetric key information in the central profile database on a per user basis along with each user's complete service profiles and to inform each user of the private key assigned in order to ensure secure spontaneous collaborations among sporadic strangers.

Preferably the said methodology inserts the required asymmetric keys in the said periodic (e.g., HELLO) packets in order to aid mutual user authentication.

It is preferred that the said methodology allows the public key information of every user to be downloadable by other users and stored locally, if possible, in the local database.

It is preferred that the said methodology includes a self-configuration protocol that runs immediately after the service/peer/device discovery, if dynamic network composition of any task-centric network on-the-fly is needed, and the said self-configuration protocol comprising the steps of:

1) getting each successfully self-configured device to disseminate the self-configured (i.e., zeroconf) address in the said periodic (e.g., HELLO) packets; and, 2) getting each newly joined device to assign itself a zeroconf address while minimising any address related conflict after having promiscuously listened to the said periodic (e.g., HELLO) packet dissemination of the neighbouring devices in priory for a constant period, Wherein, by getting a newly joined device to promiscuously listen to the said periodic (e.g., HELLO) packet dissemination by other devices in the neighbourhood for a constant time-period and avoiding self-configuring the address that is being currently used by any other device, duplicate address conflict among two or more handheld devices can be partly resolved.

Preferable the said methodology employs the said self-configuration protocol to auto-configure the task-centric network to be formed in priory to any spontaneous collaboration, wherein when it is possible for the said client module running in the handheld device to have intermittent interaction with the centralised database, the duplicate address conflict among two or more handheld devices is further resolved using timer-based usage wherein the said client module running on each device has to register its self-configured address with the central database along with the time-stamp at the time of the self-configured address being first used and whenever address conflict occurs, it will be resolved by one device contacting the central database for a look up and resolving it based on the duration a given address is used by any device.

It is preferred that the said methodology employs the said self-configuration protocol to auto-configure the task-centric network to be formed in priory to any spontaneous collaboration, wherein a timer-based address conflict resolution can still be used when the said methodology has chosen the said fully distributed mode for the spontaneous collaboration as well with the use of query/response mechanism between the parties to the address conflict or either party and a mediator.

Preferably the said methodology employs a session continuity procedure in order to ensure the session continuity of an on-going multimedia session between two or more handheld devices, wherein the session continuity is ensured from a task-centric ad hoc network formed on-demand to any infra-structure-based network or vice-versa when the said methodology adopts either semi-distributed or centralised mode while getting the centralised server/database to take additional SIP server functionality namely the registration SIP server functionality in priory, and the said session continuity procedure comprising the steps of:

1) checking to see whether there exists one or plurality of infra-structure-based networks;

2) getting the client module running in each participating handheld device of the multimedia session to maintain one SIP stack per user agent for an ad hoc network and another SIP stack per user agent for any infra-structure-based network at the time of session initiation if at least one infra-structure-based network exists in addition to the existence of the ad hoc network, wherein one SIP stack maintained for the ad hoc network is made active whereas the other is made standby/passive;

3) getting both SIP stacks to use the same Call-ID;

4) monitoring the quality of the existing links by liaising with the physical layer of the communication interface of first type being used and performing a seamless handover to any infra-structure-based network using the communication interface of second type and making the passive SIP stack meant for any infra-structure-based network active while making the SIP stack meant for the ad hoc network passive when the signal quality degrades below a threshold:

Wherein, the objective is to let a session that is originated when the users spontaneously collaborate in an ad hoc mode using the communication interface of first type while being within each other's communication range continue using different infra-structure-based network at the user's discretion even when the users move away from each other.

It is preferred that the said methodology or said secure spontaneous collaboration system employing the said novel applications and services suite that enables secure and scalable on-the-fly online multi-player gaming among total strangers, and this comprising the steps of:

1) getting prospective players to activate the gaming specific profile in the centralised database specifying the games being interested in;

2) getting prospective players to first register their new game, if any, with the centralised server/database and getting a new game identifier assigned to the new game that can uniquely and globally identify the new addition; and, 3) subsequently getting prospective players' multiplayer online gaming application to synchronise their local database with the centralised database prior to any spontaneous collaboration;

wherein once the said service/peer/device discovery protocol of the said methodology proactively has identified one or plurality of appropriate players within the radio-range while meeting the selection criteria as set out in the gaming profiles of each user in order to play secure smart multiplayer online gaming, the required task-centric network will be formed on-the-fly by the said self-configuration protocol of the said methodology and, if needed, the said methodology will make attempts to maintain session continuity even when the players move out of each other's radio range pertaining to the communication interface of first type as long as the players have the appropriate settings enabled.

Preferably the said methodology or the said secure spontaneous collaboration system employing the said novel applications and services suite that enables secure and scalable on-the-fly real-time dating among sporadic-strangers, and this comprising the steps of:

1) getting each user to set up and activate his/her smart dating profile in the centralised database; and, 2) subsequently getting dating users' smart dating application to synchronise their local database with the centralised database prior to any spontaneous collaboration;

wherein once the said service/peer/device discovery protocol of the said methodology proactively has identified the appropriate one or plurality of matching soul-mates within the radio-range pertaining to the communication interface of first type while meeting the selection criteria as set out in the dating profiles of each user, the said methodology will require the said client module of any handheld device to pop up message along with a beep in order to draw the attention of the user and at the user's discretion and based on the users' privacy settings, this message may contain the photographs and other important contact details of the matching profile for immediate identification in the local neighbourhood.

It is preferred that the said methodology or the said secure spontaneous collaboration system employing the said novel applications and services suite that enables secure and scalable on-the-fly inter-vehicle interaction facility between the first user and the second user who can be a total stranger to each other, and this comprising the steps of:

1) getting both users to set up and activate the respective profiles specific to inter-vehicle interaction mechanism in the centralised database indicating the user preference and privacy settings for the inter-vehicle interaction facility after having registered the users' respective vehicle registration numbers;

2) subsequently getting both users inter-vehicle interaction application to synchronise their local database with the centralised database prior to any spontaneous collaboration; and, wherein whenever the first user wants to interact with the unknown second user who currently travels/stays in his/her vehicle and the vehicle is currently located within the radio-range of the first user pertaining to the communication interface of first type, the first user can initiate any type of interaction with the second user by entering the vehicle registration number belonging to the second user in the appropriate UI provided by the said application as long as the privacy settings of the second user allows the first user to interact in the chosen way, and the said methodology hides the underlying communication set up without divulging the personal Profile-IDs to each other and such interaction is possible by binding each user's Profile-ID with his/her car registration number, and, if needed, the said methodology will make attempts to maintain session continuity even when the users move out of each other's radio range as long as the users have the appropriate settings enabled.

Preferably the said methodology or the said secure spontaneous collaboration system employing the said novel applications and services suite that enables sporadic strangers to identify peers having the same professional, religious, political, racial interests or the like, and this comprising the steps of:

1) getting each user to set up and activate his/her profile required for the ad-hoc friend finder application in the centralised database; and, 2) subsequently getting both users of the ad-hoc friend finder application to synchronise their local database with the centralised database prior to any spontaneous collaboration;

wherein once the said service/peer/device discovery protocol of the said methodology has identified one or plurality of people having similar professional, religious, political, racial interests or the like within the radio-range while meeting the selection criteria as set out in the profile specific to the ad-hoc friend finder of each user, the said methodology will pop up message along with a beep in the handheld device to draw the attention of the user in a large public gathering and at the user's discretion and based on the users' privacy settings, this message may contain the photographs and other important contact details of the matching profile for immediate further direct/multicast communications using the handheld device of each user.

It is preferred that the said methodology or the said secure spontaneous collaboration system launches a novel applications and services suite, wherein the said methodology allows a handheld device of a user to connect securely after having been authenticated to devices like television, monitor, smart-home central controller, overhead projector, printer, burglar alarm control, door/gate control and similar plurality of devices on the fly with an objective to manipulate the connected devices depending on a given user requirements as long as devices are within each other's radio range.

Preferably a hybrid network comprising:

1) a plurality of infra-structure-base networks; and 2) one or more handsets having the said client module and application and services suite installed, activated and run locally;

Wherein, a user handheld device running the said client module, and the said applications and services suite can connect to any fixed device connected to the infra-structure-based network in order enable one or plurality of user-to-device collaborations comprising:

1) getting directions to the nearest police post, security point, toilets, restaurants, favourite departmental stores/shops, taxi/bus stand, telephone booth and the like in a shopping mall, public place and the like;

2) getting bus, train and/or flight information;

3) getting the direction details and services of local photo-printer and the like in a shopping mall.

DESCRIPTION OF THE DRAWINGS

Non-limited and non-exhaustive embodiments are described with reference to the following figures, wherein like reference numerals refer to like parts throughout the various views unless otherwise specified.

FIG. 6 exemplarily shows the additional information needed to create/maintain/activate an optional profile needed for Smart Online Dating to work according to one embodiment of the present invention.

FIG. 7 exemplarily shows the additional information needed to create/maintain/activate an optional profile needed for Ad hoc Friend-Finder Application to work according to one embodiment of the present invention.

FIG. 10 is an exemplary graphical depiction of a HELLO Packet mainly used in the service, peer and device discovery process according to one embodiment of the present invention.

FIG. 11 is an exemplary graphical depiction of an ALIVE Packet mainly used to let the neighbours know of a given device's online status according to one embodiment of the present invention.

FIG. 12 is an exemplary graphical depiction of a QUERY/RESPONSE Packet according to one embodiment of the present invention.

FIG. 13 exemplarily shows the basic Query/Response handshake between two devices for Spontaneous Collaborations according to one embodiment of the present invention.

Alerting Mechanism in the case of Smart Dating Application according to one embodiment of the present invention.

Figure 18:
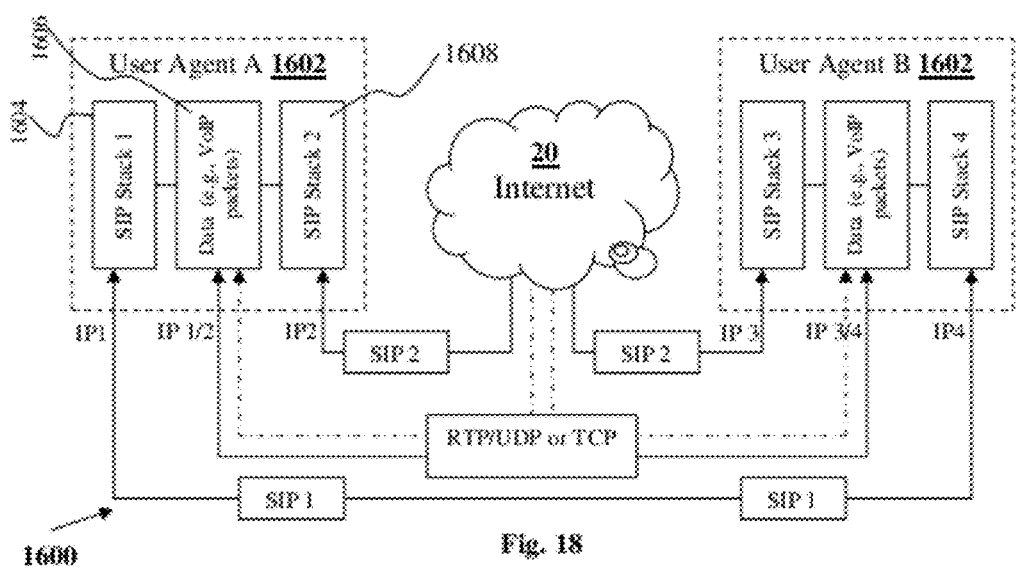

FIG. 18 exemplarily shows the availability of two SIP-Stacks per a User Agent to facilitate Seamless Session Continuity according to one embodiment of the present invention.

Figure 19:
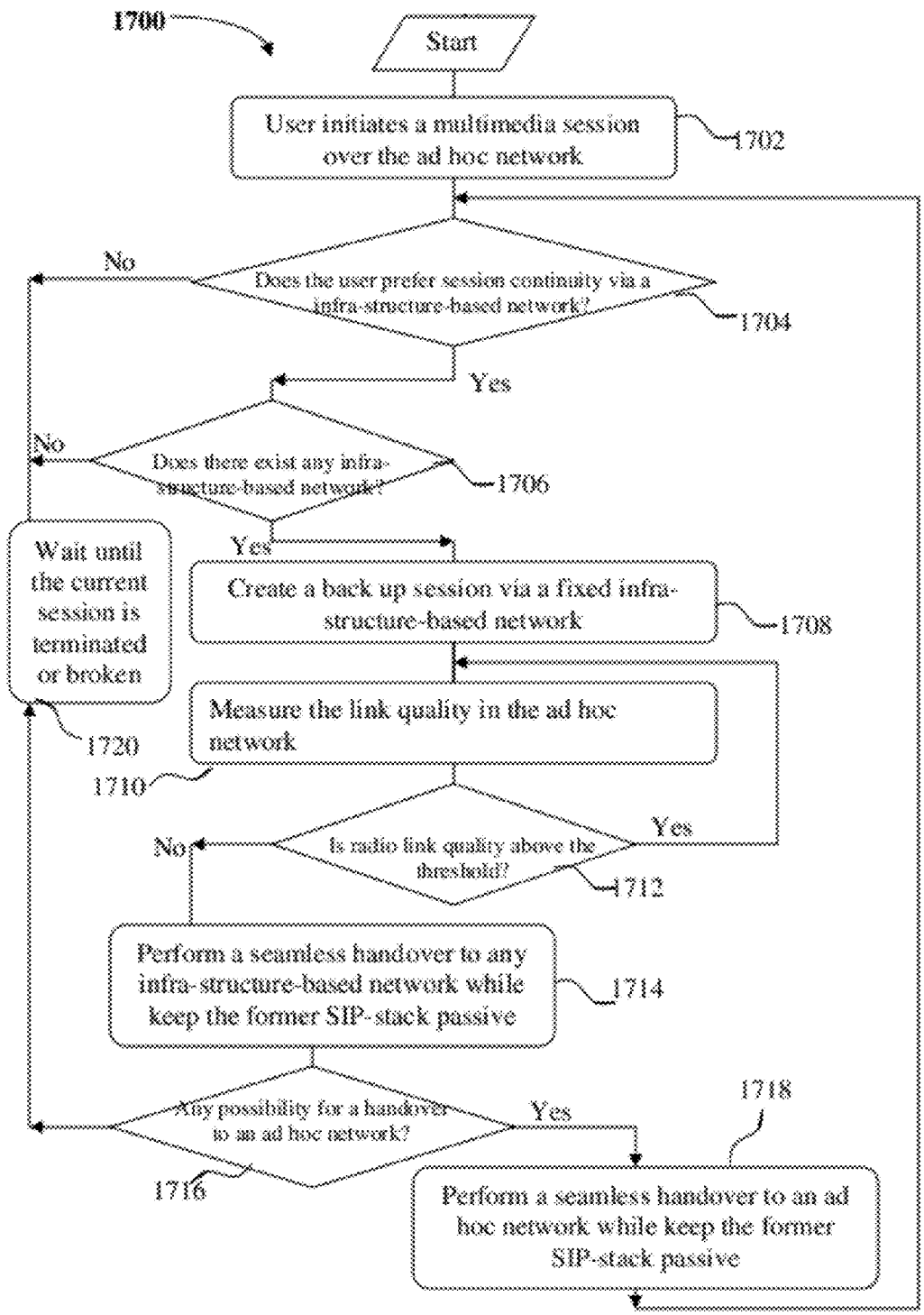

FIG. 19 is a flow diagram illustrating an overview of an exemplary process that attempts to ensure session continuity by the proposed middleware according to one embodiment of the present invention.

DESCRIPTION OF SPECIFIC EMBODIMENTS

The present embodiments are described with reference to ubiquitous communication and computing environment where there exists a plurality of heterogeneous handheld mobile computing devices and fixed computing devices all of which are equipped with one or plurality of wireless transceivers providing short-range wireless or mobile communication capabilities.

Figure 1:
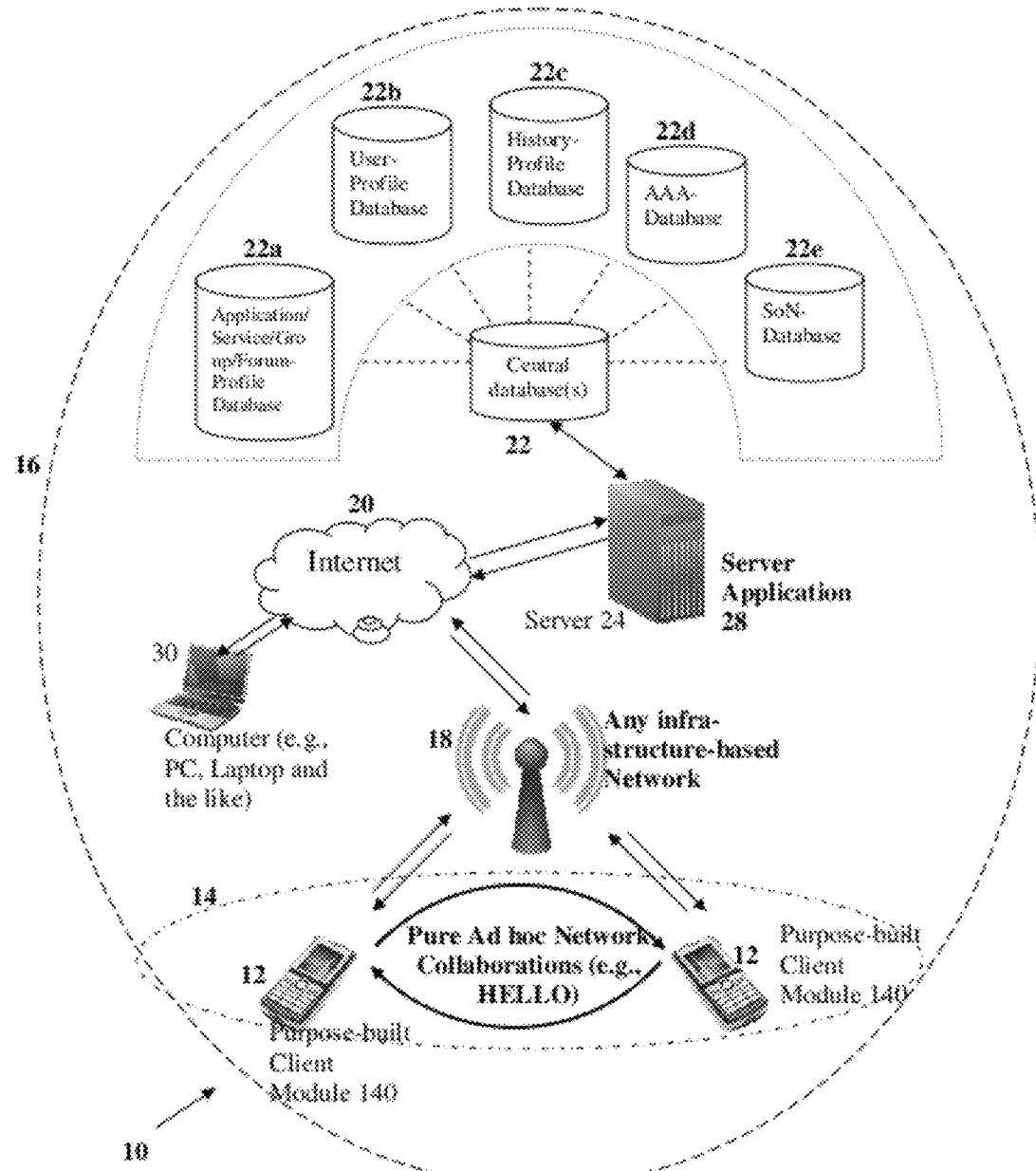
FIG. 1 is an exemplary illustrative network environment where various embodiments of the present invention are said to work.

FIG. 1 is an exemplary illustrative network environment 10 where various embodiments of the present invention are said to work. The secure spontaneous collaboration framework 10 consists of one or plurality of handheld devices 12, a server 24 running a server application 28 and maintaining one or plurality of databases 22, and an infra-structure network 18 providing connection to the Internet 20. The handheld device 12 can be a mobile phone, smartphone, personal digital assistant (PDA), netbook, laptop, tablet (e.g., Apple's iPad) or similar device being equipped with a wireless transceiver providing the communication interface of first type. The said communication interface of first type supports one or more short-range radio communication technologies such as infrared, IEEE 802.11 (WiFi/WiFi-Direct), Bluetooth, ZigBee or their variants or similar technologies. The envisaged interaction (i.e., the user-plane traffic) is between the two handheld devices 12 and such an interaction often results in the formation of an on-the-fly task-centric network (i.e., dynamic composition of an on-demand task-centric network) needed for useful spontaneous collaboration. In case the proposed spontaneous collaboration methodology prefers the formation of pure MANET that allows little interactions with any existing infra-structure during any spontaneous collaboration, the task-centric network is shown by 14. On the other hand, intermittent interaction with an existing network infra-structure is needed either in priory or during the spontaneous collaboration. In this case, the task-centric network to be formed is shown by 16 that comprises fixed and mobile devices. Any spontaneous collaboration among two mobile devices 12 is via a communication interface of first type whereas intermittent interaction between a mobile device and the centralised network is via the communication interface of second type.

As mentioned, the secure spontaneous collaboration framework 10 may optionally comprise any mobile or wireless infra-structure-based network 18 such as CDMA, TDMA, FDMA, OFDMA, SC-FDMA and other networks. A CDMA network may implement a radio technology such as Universal Terrestrial Radio Access (UTRA) and CDMA2000. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM) and General Packet Radio Service (GPRS). An OFDMA network may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM. The network 18 allows the handheld devices 12 to intermittently communicate with the centralised server 24 and the associated database 22 via the communication interface of second type for the purpose of accessing control information via the Internet 20 giving various facilities to the basic spontaneous collaborations that effectively take place between handheld devices 12 via the communication interface of first type in the dynamically formed task-centric ad hoc network 14. The communication interface of second type is the main air interface being used by 18 to communicate with any handheld device 12.

The server 24 runs its own server application 28 having multiple functionalities as it will be described later in relation with various embodiments of the present invention and communicates with one or plurality of online databases depending on its functionalities. One of the functionalities of the server application 28 is to create/maintain/delete one or plurality of profiles of a user of a handheld device 12 in the centralised database 22. Profile-IDs are used by the server application 24 to correctly identify a user and to index the database that stores user profiles. Another functionality of the server application 28 is to create/maintain information related to standard or user created applications, services, special interest forums/groups that facilitate spontaneous collaboration among two or more users of handheld devices 12 preferably via the communication interface of first type in the centralised database 22. The server application 28 will also help to detect and resolve duplicate addresses of handheld devices during the self-configuration process that occur in priory to any meaningful spontaneous collaboration, to mutually authenticate total strangers before any interactive communication and encrypt user traffic, performing prediction of any user's availability for any spontaneous collaboration given the time of the day, and to ensure session continuity as it will be described later. The client module 140 running on each handheld device 12 will liaise with the server application 28 for the purpose of accomplishing various functionalities as it will be described later.

The centralised database 22 mainly functions as the profile database/repository. As it is shown in FIG. 1, according to one embodiment of the present invention, the centralised database 22 can be thought to be composed of a variety of logically/physically separated databases in order to provide various facilities to the spontaneous collaboration taking place among users of handheld devices 12. Various databases that form part of 22 are the application/service/forum/group database 22a that stores features/attributes specific to those that enable the spontaneous collaboration, profile database/repository 22b that stores one or plurality of user-specific profiles, history database 22c that accumulates the spontaneous collaboration history of a user in real-time, AAA database 22d that contains the accounting, authentication and authorisation details of a user, and Self-organised networking database 22e that stores information to facilitate self-organisation of on-demand task-centric network formed prior to any meaningful spontaneous collaboration. This list is not exhaustive and can grow depending on future trends and technologies. The history database 22c is used for the purpose of predicting availability of a user for a given spontaneous collaboration at a given point in time based on past user behaviour. According to another embodiment of the present invention, the profile database 22b is indexed using each user's Profile-ID.

By the term user, this patent actually refers to the user of a handheld device 12. Also, terms database and repository are used interchangeably throughout this document.

Figure 2:
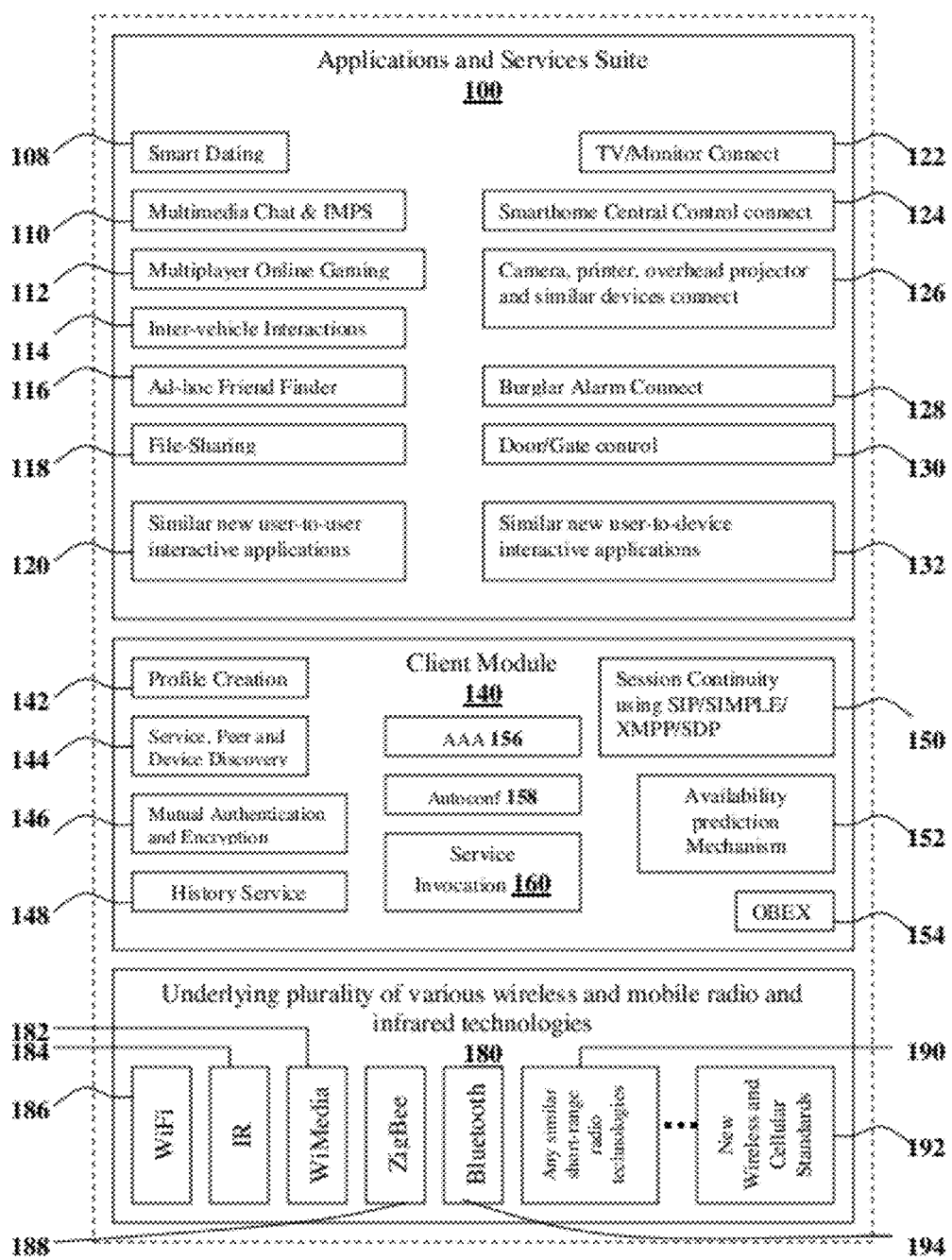
FIG. 2 exemplarily shows the client module to be installed/activated and run in any handheld device to be used for possible spontaneous collaboration using the communication interface first type along with the application and services suite according to one embodiment of the present invention.
Figure 3:
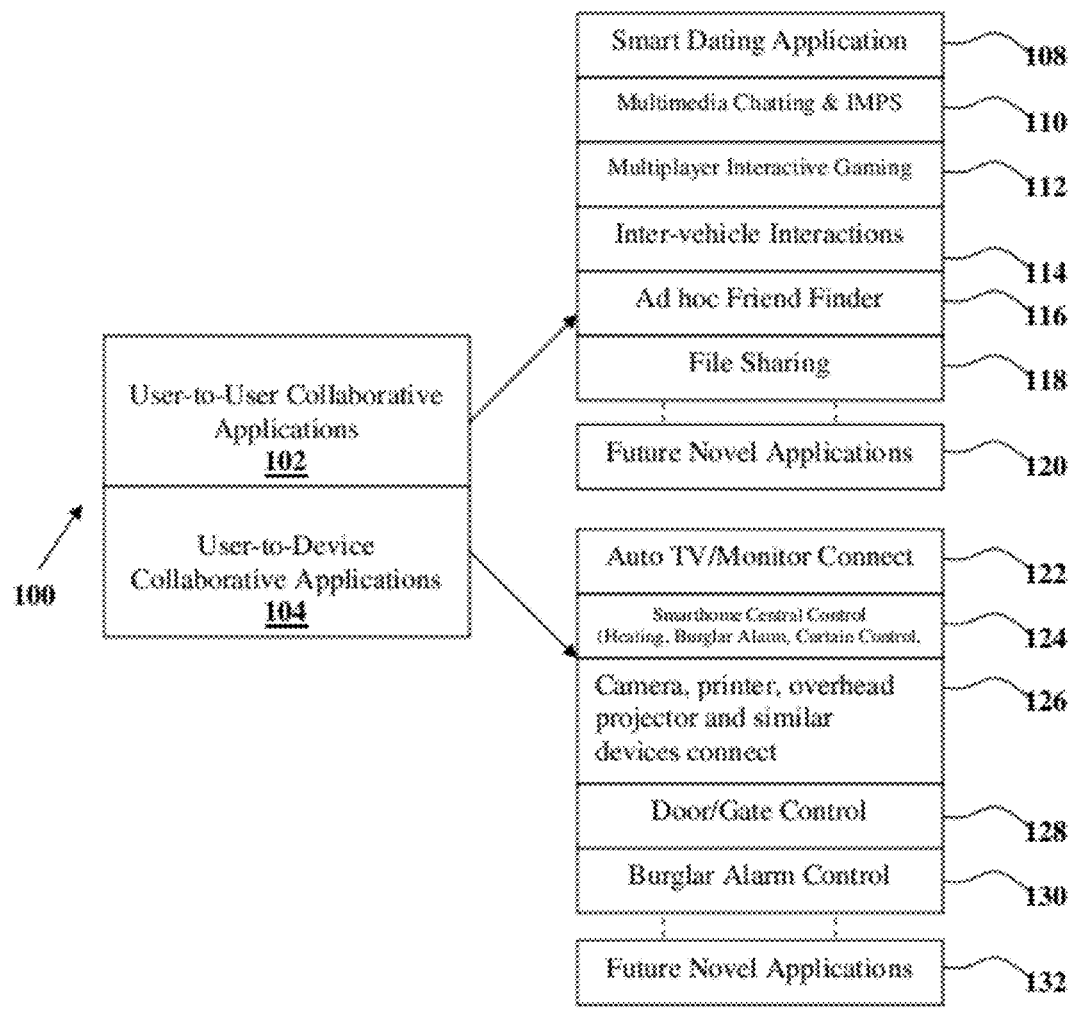
FIG. 3 exemplarily shows the categorised view of the non-exhaustive application and service suite meant to work with the proposed methodology in a novel way according to one embodiment of the present invention.

According to the first aspect of the present invention there is provided a methodology and a system that gets two or more existing handheld mobile communication and computing devices having the necessary hardware and/or software functionalities especially a wireless transceiver supporting a communication interface of first type to take part in spontaneous collaboration among each other. This is possible by transforming an existing capable handheld device through a lightweight multi-functional client module. FIGS. 2 and 3 show the primary sections of the said client module 140 and the smart application and services suite 100 to be used by the methodology and the system as proposed by the present invention. With 140 and 100, this patent takes a holistic view and tries to support a new paradigm of socialising (i.e., social networking). This multi-functional client module 140 needs to be installed and configured in a handheld device 12 along with the application and service suite 100 for the envisaged spontaneous collaboration to take place.

This client module 140 is hereinafter referred to as Mobi_HobNob client module in this document. This can be in the form of a middleware and can be based on XML, SOAP, Web services, and service-oriented architecture. According to one embodiment of the present invention, the functionalities of the client module can be implemented solely based on hardware solutions, software solutions or the combination of both. According to another preferred embodiment of the present invention, the intended functionalities of the said client module can be realised/implemented by devising a System on Chip (SoC) solutions having an appropriate software stack that runs in its one or plurality of processors. The details of these SoC solutions are not included in order not to obscure the described embodiments—but the details of which are well understood by those of skill in the art.

The Mobi_HobNob client module 140 supports in a very innovative way various applications such as smart ad hoc dating 108, multimedia chatting and Instant Messaging and Presence Service (IMPS) 110, smart multiplayer online gaming 112, variety of short-range communication applications (e.g., inter-vehicle interaction 114 using vehicle registration number), file sharing 118, and ad hoc friend-finder applications 116 (e.g., identifying people having similar political, religious and/or ethnic interests in a large public gathering and exchanging contact details for further direct/multicast communications) using the handheld device 12 that every human carries daily without heavily relying on pre-existing infra-structures 18. Given that this application and service suite 100 along with the Mobi_HobNob client module 140 enable two or more users to interact with each other through their handheld device 12, this class of spontaneous collaboration enabled through the said client module 140 is referred to in this document as a user-to-user collaboration 102.

On the other hand, another category of such short-range applications that is possible with the Mobi_HobNob client module 140 is the ease with which a handheld device 12 can be connected to a nearest TV/monitor for magnifying the handheld devices' display 122, to an overhead projector 126 for making a presentation using the handheld device 12, to a printer for taking printouts from the handheld device 12 using existing and evolving short-range communication standards (e.g., WiFi, Bluetooth, WiMedia UWB, Zigbee and so forth). Such a short-range communication technology is referred to as a the communication interface of first type. One more category is to enable businesses to perform location-based real-time advertising to handheld devices 12 and to have very interactive tradeshows based on users' tastes using the short-range communication facilities. This class of spontaneous interaction is called user-to-device collaboration 104, because the interactions are between a user (i.e., his/her handheld device 12) and another fixed device (e.g., printer, projector and the like). The Mobi_HobNob client module 140 allows total strangers to safely collaborate without meeting/knowing/seeing each other provided they are within each other's radio range pertaining to the communication interface of first type and have some common interests. With the introduction of this client module 140, it is possible to avoid a situation where two different devices 12 possessing various short-range radio technologies, only metres from each other cannot communicate because they do not share a common "language".

In order to make all these envisaged objectives and functionalities possible, the novel Mobi_HobNob client module 140 possesses the following main ingredients as shown in FIG. 2:

1) Profile Creation mechanism 142;
2) Peer user/device and service discovery mechanism 144;
3) Self-organising or auto-configuring protocol/procedure 158 to configure the task-centric network 14 formed on demand to engage in the envisaged novel applications;
4) Two way authentication and encryption 146 strategies for ensuring secure communication among total strangers;
5) History service 148 of a user allows the client module 140 to identify malicious behaviour using community-trust building technique;
6) Authentication, Authorization and Accounting (AAA) mechanism 156;
7) Service invocation mechanism 160;
8) Session continuity mechanism 150;
9) Availability Prediction mechanism 152 allows the client module 140 to predict the collaborating behaviour of a user in terms of how long a user is available for a collaboration; and,
10) OBEX (OBject EXchange);

The Mobi_HobNob client module 140 sits on top of any of the existing wireless modem 180 providing the communication interfaces of first type and second type, and hence hides the underlying connection complexity. This will in turn enable the client module 140 to choose the right air interface depending on the circumstances/user-demands. For this purpose, the Mobi_HobNob client module 140 starts using one radio short-range technology (say Bluetooth 194 and this decision is sometimes application dependent) and wait for responses. If no sufficient responses are received from the neighbouring devices, then the client module 140 will try with a different short-range radio technology (say, WiFi 186). This process will continue until the required response is received from the neighbouring devices or maximum attempt is reached—depending on whichever happens first. This technique is preferably used in the case of user-to-device collaboration 104.

In order to support the client module 140 especially in case semi-distributed or centralised mode of operation is chosen for the preferred spontaneous collaboration among the users of handheld devices, the server application 28 will also support the corresponding functionalities of profile creation, service/peer/device discovery, mutual authentication and encryption, history service, AAA, auto-configuration, session continuity and availability prediction as depicted respectively by 142, 144, 146, 148, 156, 158, 150 and 152.

Another important feature of the Mobi_HobNOb client module 140 is that it allows different devices to initiate the neighbour discovery using different short range radio technologies (collectively referred to as the communication interface of first type). This is because the Mobi_HobNob client module module 140 is the first of its kind to cohesively make use of all the wireless communication standards a handheld device 12 possesses. In other words, the Mobi_HobNob client module 140 avoids the situation where two different devices 12 only metres from each other cannot communicate because they do not share a common "language".

This combined novel client module 140 and service/application suite 100 is beneficial to both the end-user and the service provider. It is economical from the end-users' perspective because they use the communication interface of first type (e.g., WiFi, Bluetooth, Zigbee or WiMedia UWB) to communicate directly with another user in their vicinity (e.g., with a typical wireless range of 32~150 m) without using any of the infra-structure-based networks 18 for them to engage in the above-mentioned applications. Given that collaborators possibly stay close to each other and the fact that some of the short-range radio technologies can support quite a high bit rate when compared to the infra-structure-based network 18 counterparts (e.g., WiMedia UWB 480 Mbps and beyond and hence much higher than 3GPP's Long Term Evolution (LTE)), it is very beneficial to use the short-range radio technologies (i.e., communication interface of first type) as opposed to using the fixed networks 18 (i.e., communication interface of second type) from users' point of view.

On the other hand, the envisaged two-way authentication and asymmetric encryption 146, if used, techniques requires periodic communication with the centralised database 22 (especially the AAA database 22d of FIG. 1) that has the PKI functionality (this communication is needed at least at the time of communication establishment), and this requires communication via the service providers network 18. In addition, when the two peer users depart from each other while being engaged in an envisaged online application, the proposed methodology and the system enables a seamless handover to any of the infra-structure-based networks 18 (often service providers' network) often with a possible pop up warning to the end-user regarding the handover and the possible service charges that may apply. However, it is highly likely that the users will continue their online application irrespective of whether they are switched to the infra-structure-based network 18, even it involves usage based charging. In other words, the users will be lured to use the infra-structure-based network 18, although they initially establish their communication/computing in an ad hoc manner without using any pre-existing infra-structure 18/20/22/24 (i.e., ad hoc networking principles using WiFi, Bluetooth, or Zigbee capabilities). This will enhance the revenue potential of the service provider. In other words, the spontaneous collaboration methodology, system and framework as proposed by the present invention are beneficial to both the end-user as well as the service providers of any of the infra-structure-based networks 18.

As mentioned before, at the moment, people are scared of using the short-range radio technologies for spontaneous user-to-user or user-to-device mainly because of the possibility for anyone to hack into their computing/communicating device 12. However, if this problem is solved, it is possible to introduce very innovative commercial applications. Security is the big issue and the Mobi_HobNob client module 140 aims to tackle this by getting the user to register their profile with a common PKI. With 142, profile registration/creation/ activation and maintenance is possible via the Internet, and the server application 28 is responsible for storing user-specific profiles in the profile database 22b. According to one embodiment of the present invention, the successful registration/activation of a user-profile will get the server application 28 to assign asymmetric keys to the user. Every user's profile along with his public key (certificates) can be periodically downloaded from the central database 22 by a client module 140. This centralised database 22 is called the Mobi_HobNob central database that is indexed using the Profile-ID.

This Mobi_HobNob centralised database 22 holds information such as service profile, public and private keys, past collaboration history to enable prediction, temporary identifier (e.g. IP address) to resolve duplicate address conflicts, any attempt of malicious behaviour to facilitate community trust building of each registered user as it will be explained later. In addition, the centralised database 22 incorporates SIP/XMPP/SIMPLE server functionalities, especially like a REGISTRAR. This will also provides functionality for Public Key Infrastructure (PKI) and other services as identified in subsequent relevant sections. It is possible to keep a copy of the centralised database 22 locally in a "thick" handheld device, and this local database is referred to as Mobi_HobNob localised database. This allows two-way authentication and encryption and decryption of transmission between peers. Community-based trust building like in ebay is also possible with the proposed framework. The second is possible by extending the functionalities of the server application 28 and saving extra details about each user in the profile database 22b, as it will be explained later.

Sufficient description of the various functional modules will now be provided:

1) Profile Creation Mechanism 142

This is one of the vital parts of the envisaged spontaneous user collaboration methodology, system and framework as proposed by one embodiment of the present invention. The purpose of the profile creation/settings as facilitated by 142 is to uniquely identify either a particular user or a particular device 12 that tries to spontaneously collaborate with another. This is an important ingredient for both the user/device authentication and encryption.

Figures 4, 5:
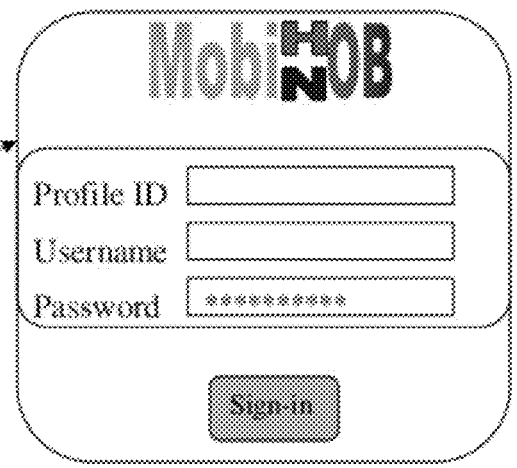
FIG. 4 illustrates one exemplary main Profile Window or user interafece being used by any user to create/maintain/activate the main user-specific profile according to one embodiment of the present invention.
FIG. 5 illustrates one exemplary Password Protected window or user interface being used to activate the locally installed client module in a handheld device by the user according to one embodiment of the present invention.

The profile creation 142 of FIG. 2 is possible either centrally by connecting to the centralised server 24 via the Internet 20 or locally using the client module 140, application and services suite 100 running in any handheld device 12, and accordingly an interested user is expected to fill in the main profile form 200 as exemplarily shown in FIG. 4 where the user needs to enter his/her first name, surname, middle name (if any), preferred user name, date-of-birth, mobile telephone number, main nationality, and preference in relation to the use of some of the innovative applications envisaged here using radio buttons and dropdown lists. If the handheld device 12 is used to create/activate/modify/disable/delete a particular user's profile, the details have to be passed onto the Mobi_HobNob's central database 22 by connecting to the server 24. The server application 28 handles the profile creation and maintenance centrally and stores the user-specific details in the profile database 22b.

The server 24 and the server application 28 may introduce new features, applications and facilities in the future depending on the technology, market trend and user preferences, and hence a user is expected to update his/her profile periodically and make periodic upgrade of the Mobi_HobNob client module 140 and necessary settings in his/her handheld device 12. However, the main profile page 200 is less susceptible to change, although new applications, features, and facilities can be introduced in the future. If a user is preferred in any of the applications supported by the Mobi_HobNob's platform (this varies from time to time), he/she has to make the necessary settings in application-specific profiles. Once the main profile is successfully activated by any user, he/she will be assigned a unique alpha numeric reference number termed Profile-ID that will uniquely identify the user world wide. Preferably, according to one embodiment the Profile-ID is a 16-digit alphanumeric. The user has to then install the Mobi_HobNob client module 140 into his/her handheld device 12 which has multimodal capabilities, and enter this Profile-ID at the time of platform initialisation on the exemplary window 300 as shown in FIG. 5 in order to activate it. For security reasons, the Profile-ID of a user is not divulged to anybody. This profile setting, however, depends on different applications. The Profile-ID logically associates/binds a user and his/her handheld device running an activated client module to an activated profile being stored either in local database or centralised database 22.

In the case of user-to-user collaborations 102, the profiles of each application share some common information pertaining to each user. According to one preferred embodiment of the present invention, when a user creates a profile in the Mobi_HobNob's central database 22 by accessing the server 24 and the server application 28 that will function as (or may be linked to) a PKI, he/she will be assigned asymmetric keys as well. The public key details of each user are available from the centralised database 22 through the server application 28 for periodic download, and this can be stored locally in a handheld device 12 in order to avoid maintaining unnecessary communications with the infra-structure-based network 18 in case this option is preferred by the user depending on the handheld device 12 capabilities as it will be explained in the next section. The unique Profile-ID and asymmetric keys of a user can be used for mutual authentication of a particular user in priory to a spontaneous collaboration.

The password protected (as shown in FIG. 5) client module 140 running on each handheld device 12 should inform its presence in its neighbourhood. This is possible with a periodic dissemination of Profile-ID as it will be explained in the next section.

There exist two options for the profile based secure spontaneous collaboration to work; i) the first option is to let the client module 140 running on any handheld device 12 check the profile in the central database 22 on receiving the broadcast Profile-ID by communicating with the server application 28 using any infra-structure-based network 18 and check its authenticity, profile match etc., in the Mobi_HobNob's central database 22 and ii) the second option is to let a handheld device 12 keep a local copy of the up-to-date Mobi_HobNob's central database 22 (except the private keys/information of other users) consisting of Profile-IDs of all users (XML is used for convenience) and check the authenticity, profile match etc. locally without having to communicate with the central database 22 using any infra-structure-based network 18. While the first option is more suited to "thin" handheld devices 12 that do not have the luxury of having reasonable memory footprint, the second option is suited well to "thick" handheld devices 12 that have amble memory capacity. According to one embodiment of the present invention, the server application 28 in the first case will hence handle service/peer/device discovery and profile matching functionalities as well at the request of a client module 140 running any device 12. Profile-IDs are used by both the client module 140 and the server application 28 in order to correctly identify a given user or his/her handheld device 12. Whenever a user with a profile X communicates with another user having profile Y, limited information like name, phone numbers (depending on the user X's personal privacy and security settings) can be retrieved from the stored profile database 22b. If X has recently registered with the central database 22 via the server 24 and that information is not available in Y's local profile database, Y should always connect to the central database 22 (functioning also as a Public Key Infrastructure (PKI)) and check whether X can be authenticated. If so, Y has to synchronise the local database with that of the centralised via the server 24, and subsequently check whether the received profile is matched with the criteria set by Y. The profile databases maintained centrally and locally are encrypted and only the Mobi_HobNob client module 140 knows how to decrypt and access each profile—hence is not visible to any user.

In the case of smart online dating application 108, additional information as exemplarily depicted in FIG. 6 needs to preferably be entered into in order to complete the profile details of a user. However, the details required for this dating application is not exhaustive, and new more details will be needed depending on future dating trends and circumstances. The same can be used for multimedia chatting application 110.

The user is given a chance to prioritise, in terms of user preferences, every application/service or any special interest group/forum supporting spontaneous collaboration that a user is interested in.

In the case of mobile interactive multiplayer gaming 112, the gaming profile should include the name of the player and the IDs of the game (i.e., game IDs) the player is able to play using his/her handheld device 12. Please note that whenever a new game is released, its name has to be registered in the Mobi_HobNob central database 22 (by accessing the server 24 via the Internet) where a unique number (in an increasing order) known as a game ID will be assigned to each game appended to the game list. According to one embodiment of the present invention, details of application/services, game IDs or forums/groups that enable spontaneous collaboration among handheld device 12 users are stored in 22a by the server application 28. This information is needed for each player to know as to what type of games a user in the local neighbourhood is able to play. Each application/service or special interest group/forum is assigned and identified using a globally unique identifier called Service ID. According to one embodiment, each entry of database 22a corresponds to a unique service/application/group/forum/game and includes specific attributes/features that are specific to a given service/application/group/forum/game. The database 22a is indexed using a Service ID or Game ID—both of which are of same type and length.

In the case of inter-vehicle interaction application 114, the user has to specify in the main profile window 200 whether he/she allows inter-vehicle interaction 114 facility whereby another by-passer will be able to spontaneously interact with a former by entering the former's vehicle registration and dialling. This interaction is facilitated through the short-range wireless standards (i.e., via the communication interface of first type) as long as the caller and the callee are within each other's radio range. On the other hand, such interaction can also be facilitated via any infra-structure-based network 18—but the client module 140 will hide the mobile number or any other address (e.g., IP) for security and privacy reasons. In case a user's vehicle gets stuck in a traffic jam, he/she can communicate with another vehicle passenger that is stuck in front of the former to initiate any of the interesting and innovative applications as envisaged by this patent. For instance, if there is an accident, handheld devices 12 can collaborate with each other to stream the video footage in case the device 12 that is located very close to the accident scene has a webcam/camera. This is possible through the inter-vehicle interaction facility that the client module 140 facilitates, as users can communicate with strangers as long as the initiator knows the vehicle registration number and such collaboration does not impair the privacy settings of the callees (i.e., other users). A user has control over who can contact him/her using the inter-vehicle interaction facility provided by the secure spontaneous collaboration framework 10. For this purpose, each user who is interested in the inter-vehicle interaction facility should fill in a profile window 500 similar to the one used for the Ad hoc friend finder application 116 as exemplarily depicted in FIG. 7. The inter-vehicle interactions can be in the form of multimedia chatting, VoIP call, online gaming, file sharing or even a voice/video call via the mobile/satellite cellular network without the caller having to know the mobile number of the callee. the caller has to enter the vehicle registration number of the callee and the client module 140 will get the corresponding Profile-ID of the callee by from the centralised database 22 by first contacting the server application 28. In case the callee has an active profile pertaining to inter-vehicle interaction facility, the server application 28 even get the mobile number of the callee and pass it on to the client module 140 running on the device 12 of the caller. The client module 140 of the caller will subsequently dial the required mobile number without letting the caller know the mobile number of the callee—this is to ensure the privacy. Only the preferred user names appear at either ends—callee will see the caller's preferred username and the callere will see the callee's preferred username on their respective handheld devices 12.

In the case of ad hoc friend finder application 116, the information as exemplarily depicted in FIG. 7 can preferably be used. Again the list as shown in FIG. 7 is not exhaustive, and new more information may be required in the future depending on tomorrow's trends and circumstances. However, a care is taken to ensure backward compatibility when new features are introduced.

By entering the details according to what best suits a particular user, he/she will impose criteria in terms of who can spontaneously collaborate; for instance, a user of handheld device Y may impose eligibility criteria (i.e., limit the user collaborations) such that a user of particular age-limit, ethnic origin, religious view, gender, country of residence etc., can collaborate with the user of Y. In other words, a user is given the chance to specify whether he/she wants to communicate spontaneously with people who are from a particular geographical area (Global/Continent/Country/Counties), have a common mother tongue, belong to a certain religious views, ethnic group or the like. Profession-specific information is kept for a user to ask questions related to a particular profession.

As mentioned before, on receiving a broadcast Profile-ID, the Mobi_HobNob client module 140 running on each device 12 will check whether the received Profile-ID satisfies the filtering criteria as specified by the user that received it in his/her ad hoc friend finder profile—three different Mobi_HobNob modes are used for this purpose. Once these criteria are satisfied and the necessary communication channel is established between two or multiple peers, electronic business card can be exchanged again using the short-range radio communication facilities (e.g., ZigBee is ideal).

If more than one Profile-ID satisfies the criteria set by a particular user, collaboration using multicast is possible. In addition, in the main profile window 200 as shown in FIG. 4, the device user has to specify whether he/she prefers user/device collaborations and inter-vehicle interaction in order to allow the above-mentioned applications in the handheld device 12.

Further, in case a user prefers session continuity, the proposed methodology, the system and the secure spontaneous collaboration framework 10 of the present invention will maintain user collaboration using any fixed infra-structure-based network 18 whenever collaborating users using short-range radio communication standards move away from each other such that they will be out of each other's radio range. In other words, a user is given a chance to specify whether an ad hoc collaboration or inter-vhicle interaction or any multimedia interaction should continue via any infra-structure-based mobile/wireless network 18 in case the collaborated users move away from each other.

New services/applications/forums can be introduced by any user using the "Add New Application or Service" either by accessing the server 24 using a PC 30 once user being properly authenticated after having entered the loging credentials as mentioned before or by directly entering locally in his/her handheld device 12. In either case, the associated server application 28 will store the details of every new addition directly in the central database 22 (more specifically in 22a) after having assigned a unique Service ID. This requires that each user has to regularly synchronise the local database with the central database 22 by connecting via the server 24, and the client module 140 and the server application will perform the necessary handshake to perform the update/synchronisation automatically.

Synchronising the central database 22 as well as the local database is equally important, as new users may have joined the Mobi_HobNob user group/club and there may have been new services/applications/forums introduced by others. In case, both a local and central databases are not synchronised in terms of the contents and there is no way to connect to the central database 22, the service discovery mechanism 144 is robust enough to find relevant service and configuration details of those services as it will be explained in the next section.

Another possible application scenario that can fully utilise the features offered by the proposed methodology, the system and the secure spontaneous collaboration framework 10 of the present invention is where users create their own "common interests" groups or forums and members can join these groups, and then spontaneously collaborate using any of the short-range communication technologies. This is very similar to group creation in existing social networking sites such as facebook, myspace, linkedin and the like. A group of people who want to do a joint document editing or a lecturer who wants to share the contents of his/her handheld device/computer 12 with his/her students can make use of this special interest group/forum feature of the proposed methodology, the system and the secure spontaneous collaboration framework 10 of the present invention in order to achieve their goal very easily with less manual intervention. The centralised server 24 and its server application 28 facilitate this, and whenever a group/forum is created it will be assigned a unique Service ID, in a similar way to Service IDs being assigned to each of the applications/services described before. This unique Service ID will be helpful in the service/peer discovery 144 process. The centralised server 24 and the associated server application 28 can be contacted by the user at the time of profile creation or new service/application/forum/group/game addition using existing web technologies in case the user uses a PC 30 to perform these tasks. On the other hand, in case the user uses a handheld device 12 running the client module 140 to perform these tasks, the client module 140 will automatically contact the server application 28 to do the necessary operations.

The creators of every special-interest group/forum should include a detail list of the professional skills, interests, and other criteria that need to be satisfied by the prospective members of this group. This information is vital for the service discovery mechanism 144 for identifying the right users/devices for spontaneous collaborations.

Given that various users may create their special interest groups/forums round the clock, all users are supposed to periodically upgrade their client module 140 and/or to update/synchronise the local and central databases 22. In order to facilitate this, on connecting to the server application 28, it will be automatically checked whether any upgrade or database update is needed. If so, the user will be prompted. On the other hand, the central database 22 update is performed if that is deemed necessary without waiting for any user input.

The key point is that business establishments/supermarkets can create forums, let the prospective customers join the forums, and perform localised advertising whenever the subscribed customers visit their stores. This will let the supermarket management to perform very promising on-time demographic-based advertising letting the visited customers know about the current promotional offers, and lure them to buy products. This strategy is very effective and has immediate positive returns/effects.

This will also help supermarket management to know the buying pattern of customers and can analyse it based on age group and gender, in case the customers use mobile wallet—this will in turn help them perform very effective advertising on the customer's next visit. For instance people can register their interests in a particular business/institution by connecting to the server 24 via an Internet using existing web technologies (e.g., HTTP) and on their visit to that company related trade show, the business/company/institution can exchange vital information (e.g., leaflets, brochures and the like) via the handheld device 12 in both a proactive and reactive manner—thanks to the proposed methodology, the system and the secure spontaneous collaboration framework 10 of the present invention. This solution is greener as hardcopy leaflet distribution can be avoided/minimised. Upcoming trade shows/events can be advertised on the client module 140.

Once successfully established communication channel with another using the communication interface of first type (i.e., any short-range communication technology) file-sharing is possible with a simple drag-and-drop using a Microsoft's Windows Explorer like application. As it can be perceived, the proposed methodology, the system and the secure spontaneous collaboration framework 10 of the present invention can lead to an entirely new social networking paradigm, even though they can complement existing social networking mechanisms such as Facebook/MySpace.

2) Service/Peer/Device Discovery Mechanism 144

A service is any entity that can provide information, perform an action, or control a resource on behalf of another entity. A service may be implemented as software, hardware, or a combination of hardware and software. In the envisaged context, a service is provided by one of the applications/services of the applications and services suite 100 as listed down in FIGS. 1 and 2 or new applications/services that may be devised in the future, any of the built-in hardware the handheld device 12 possesses like a camera, a pico-projector and the like, or combination of both the hardware and software.

In mobile ad hoc networks (MANETs) 14, a decentralised Service Discovery protocol is preferred to a centralised one in order to satisfy the basic tenet of not relying on any infrastructure 18. However, this is not the absolute requirement if devices forming a given spontaneous task-centric network 16 still maintain connectivity to other infra-structure-based networks 18.

Given that this is expected in the envisaged system, the proposed methodology, the system and the secure spontaneous collaboration framework 10 of the present invention are versatile enough let the spontaneous collaboration operate in a centralised, distributed or a hybrid mode in order to suit the dynamic network conditions and user preferences. This mode selection depends on the capability of a handheld device 12, user's discretion and the current circumstances, and the main objective of this mode selection is to minimise control overhead while providing a quick response.

The only major drawback of any protocol in a standalone mobile ad hoc network 14 is that the control signalling of the protocol itself is enough to saturate the limited wireless bandwidth because of the very dynamic nature of the network. Keeping this in mind and given that the spontaneous network being formed on demand is not always standalone in terms of connectivity it maintains with other infra-structure-based networks 18, the proposed methodologies, Mobi_HobNob client module 140 and the associated protocols adapt.

The very basic design ensures that the Mobi_HobNob client module 140 and the associated protocols do not generate too much control overhead, and this depends on whether a given handheld device 12 is "thick" in terms of the internal memory capacity and processing power it possesses.

Given that in the envisaged ubiquitous environment it is possible to expect heterogeneous devices 12, the client module 140 and especially the Service Discovery protocol 144 of FIG. 2 are made robust enough to support any mode of operation. The operating mode of the Mobi_HobNob client module 140 and its Service Discovery protocol 144 can be:

1) Fully distributed approach as in a pure MANET (this mode is very heavy-weight).

2) Semi-distributed approach—often applicable/suitable for a "thick" device 12 (overhead lies in the middle).

3) Centralised approach—more suitable for a very "thin" device 12 (this mode of operation is very lightweight).

At first, the proposed methodology, the system and the secure spontaneous collaboration framework 10 of the present invention expects the client module 140 to sniff all the available channels in order to determine the mode that is more suitable to the current congestion level of the least congested channel (i.e., depending on the bandwidth availability of the least congested channel of the ISM band).

Figure 8:
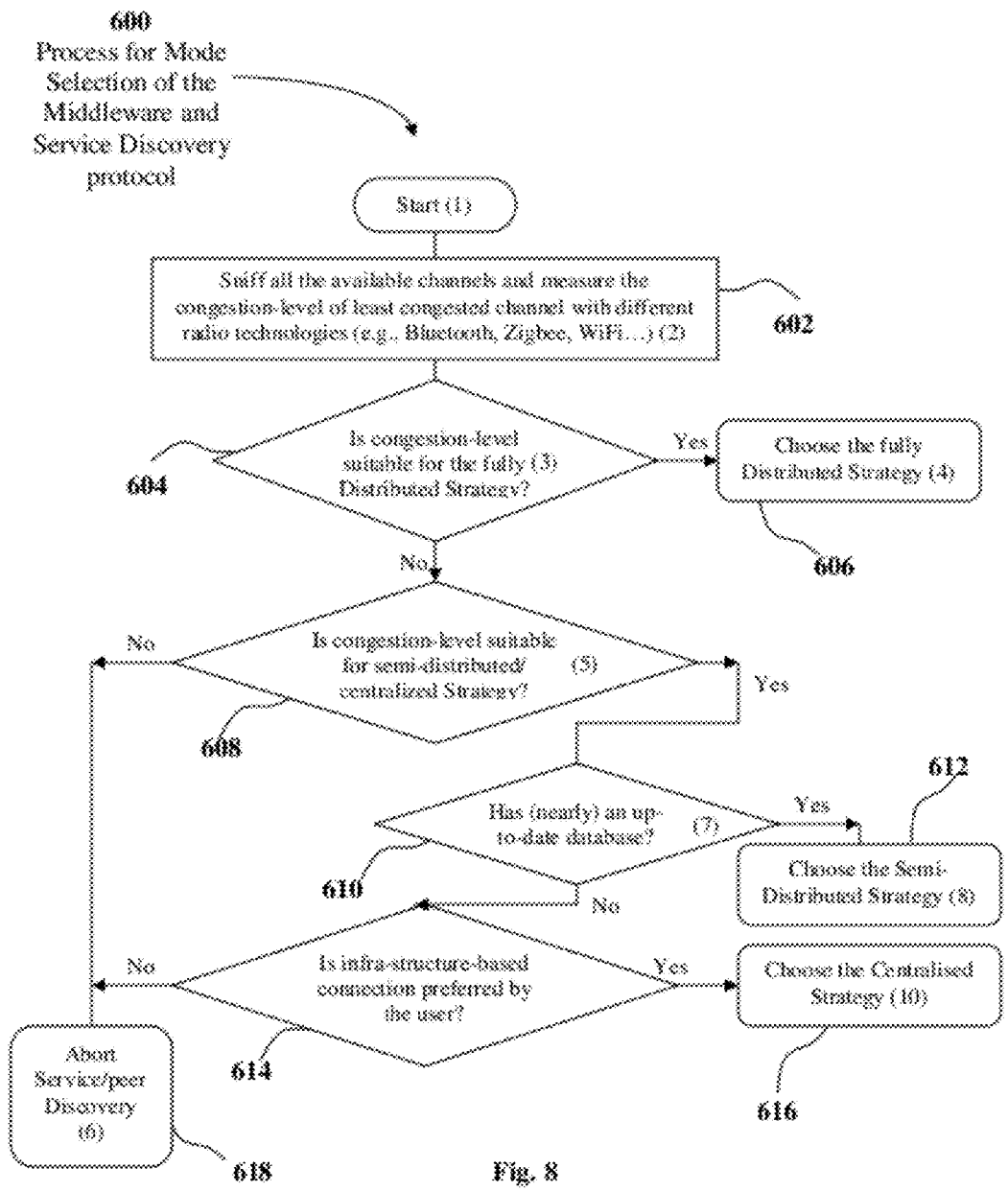
FIG. 8 is a flow diagram exemplarily illustrating the operation of the operating mode selection procedure of the proposed methodology enabling scalable/secure spontaneous collaboration among the users of various heterogeneous handheld device users according to one embodiment of the present invention.

FIG. 8 is a flow diagram illustrating an overview of an exemplary process and the steps involved as necessitated by the Mobi_HobNob client module framework 140 and the Service Discovery protocol's 144 operating mode selection procedure/algorithm of the proposed methodology, the system and the secure spontaneous collaboration framework 10 of the present invention. Given that the localised mobile/ wireless spontaneous collaboration may use ISM band and this band is susceptible to quick congestion, the process for Mode Selection 600 starts by first sniffing the entire available channel to see whether the service discovery will be comfortably supported. There exists several ways to check the bandwidth availability depending on the short-range radio technology being employed. For instance, in the case of IEEE 802.11 a/b/g/n technology, the method as specified in [2] or constant SNR measurement can be used.

In general, constant SNR/RSSI measurement is applicable to any other radio technology. The fully distributed Service Discovery protocol introduces more control overhead than the other two. However, a care has been taken to make this fully distributed SD protocol less heavy-weight when compared to the Service Discovery protocols that are proposed for MANETs. Hence, depending on the congestion level of the less congested channel, appropriate service discovery mode is chosen by the operating mode selection procedure/algorithm as shown in FIG. 8.

As mentioned before, the envisioned goal of the proposed methodology, the system and the secure spontaneous collaboration framework 10 of the present invention is to enable either users to spontaneously get together using their handheld devices 12 (referred to as user-to-user collaborations, e.g., user A and user B prefer to play a multiplayer online mobile game) or devices themselves to compose a network (user-to-device collaboration, e.g., user A's handheld device needs to connect to a local printer). In order to enable user-to-user collaborations the above three types of mode are used, whereas for a user-to-device collaboration, a different version of a centralised Service Discovery protocol is proposed as will be explained later.

Mode A: Fully Distributed Service Discovery Protocol for User-to-User Collaborations:

A fully decentralised strategy is desired in order not to rely on any pre-existing infra-structure 18/20/22/24 even if any of them exists; i.e., this mode is used in a situation where the handheld devices 12 which are in search of a spontaneous user-to-user collaboration do not maintain any infra-structure-based network 18/20/22/24 connectivity during the spontaneous collaborations. In other words, these handheld devices 12 are currently located in a region where there is no Internet, cellular or any other fixed/wireless network connectivity. Another possible situation is where the participating devices 12 do not want to use any of the infra-structure-based networks 18 even if they do exist for any spontaneous collaboration. These two scenarios hence envisage standalone MANET 14 operations for a spontaneous collaboration.

Given that in this dynamic environment device/user mobility causes the frequent failure and reactivation of links, there is a need for a very robust device/peer/service discovery mechanism for devices 12 to first identify and subsequently collaborate with the desired peer entities in an "anywhere and anytime" manner. This is facilitated by the following protocol.

Service Discovery (SD) in the MANET environment, where the set of services that are available changes dynamically depending on the effective radio range of devices in motion, is qualitatively different from service discovery in traditional infra-structure-based network 18 environments.

Given that in this case relying on any infra-structure-based network 18 is ruled out, the network to be formed should rely on itself. Hence, a fully distributed SD is preferred to a centralized one. The proposed fully distributed SD mechanism adopts some of the key features of Jini [13]—however, every measure is taken to make it more suitable to a peer-to-peer environment. Jini has some inherent features that forbids it from being more widely accepted in a peer-to-peer ad hoc network 14 environment: given that Jini follows a centralized approach, it may lead to a single point of failure and its lookup service architecture is too resource demanding.

Both "thick" and/or "thin" types of devices 12 can be found in the envisaged ubiquitous environment. Therefore, it is always wise to adopt a very lightweight distributed service discovery framework to cater for the capabilities of "thin" nodes, while trying to offer as many of the desirable features of Jini as possible to "thick" devices.

Accordingly, the proposed scheme makes sure the existence and maintenance of lightweight look up server or service repository per each "thick" communicating device 12. The entries of every lookup server are subject to a timeout mechanism. In contrary to Jini, the proposed service discovery mechanism adopts a very lightweight strategy whereby each entry/record of the lookup servers is not proxy-based, because a proxy-based approach demands high resource usage (However, usage of such a proxy-based strategy in modern "thick" devices is not ruled out). Instead, an entry is a description of a service and its attributes using a descriptive language defined using the extensible markup language (XML).

In order to ensure that an envisaged lookup server locate the required services with minimal search time, each lookup server makes use of a tree-based service registry with an objective to logically group services by category. One of the desirable features of this tree-based approach is that a tree has a number of levels that represent service classification. With this approach, as anyone moves down the tree from the root to the leaves, services become more specific. This tree-based strategy enables each "thick" communicating device to maintain the known services in a systematic way, and hence helps to bring down the latency involved in the service discovery process. For example, a printer service can be identified by the following logical path name: "<path>RootService:HardwareService:PrintService:LaserPrint</path>," under which it is possible to identify the preferred printer of anyone's choice depending on its attributes (e.g., colour, 300 dpi, 35 ppm). Another example is in relation to multiplayer mobile gaming; "<path>RootService: SoftwareService:Game:Interactive</path>" under which it is possible to identify information such as number of minimum interactive players required, capability of the device in terms of codecs supported, screen resolution and extra input/output facilities, port numbers used etc.

The following lines will explain how this fully distributed SD suits the middleware's holistic objective of enabling spontaneous user-to-user collaborations.

Given that relying on any infra-structure-based network 18 is ruled out, the user is supposed to fill in all the relevant profiles as explained in the previous section in the handheld device 12 itself unless performed previously. Another possibility is to let the user create/activate his/her profile online as explained before by contacting the server 24, install the client module 140 and connect the device 12 to the Mobi_Hob-Nob's centralised database 22. This will make relevant entries in the service-repository of each handheld device in terms of the user-to-user collaborative applications that the handheld device 12 user is interested in (i.e., provides). The term "services" include all the applications that the user of the handheld device 12 is interested in—i.e., such user collaborative applications as smart dating, multimedia chatting, mobile multiplayer interactive gaming, inter-vehicle interactions, ad hoc friend finder and file sharing, and device collaborative applications as depicted in FIGS. 1 and 2. Please note that the list of these applications is not exhaustive, meaning that it tends to grow depending on future trends.

In addition a user can create his/her own common interest group/forum by clearly defining it—and the middleware 140 supports this as explained in the earlier sections. Depending on the types of such applications/forums/services a user is interested in and whether a user is currently in search of a spontaneous collaboration for any of such applications, a corresponding entry will be created in the local service repository of the handheld device 12. Each entry is rich in terms of providing a description of a service and its attributes using a descriptive language like XML, and each lookup server makes use of a tree-based service registry containing list of entries. Each service entry contains information about a single service that any of the above-mentioned or any future applications provides, and each entry/record contains a list of service attributes. The proposed methodology, the system and the secure spontaneous collaboration framework 10 of the present invention allow any handheld device 12 to function both as a server and as a client from the service discovery perspectives, and a SD client can retrieve information from a service entry/record maintained in the service repository of another device by examining the received HELLO packets as will be explained in the next paragraph. Depending on the active application/service profile, the SD will initiate a service discovery process looking for relevant peer users or devices.

Figure 9:
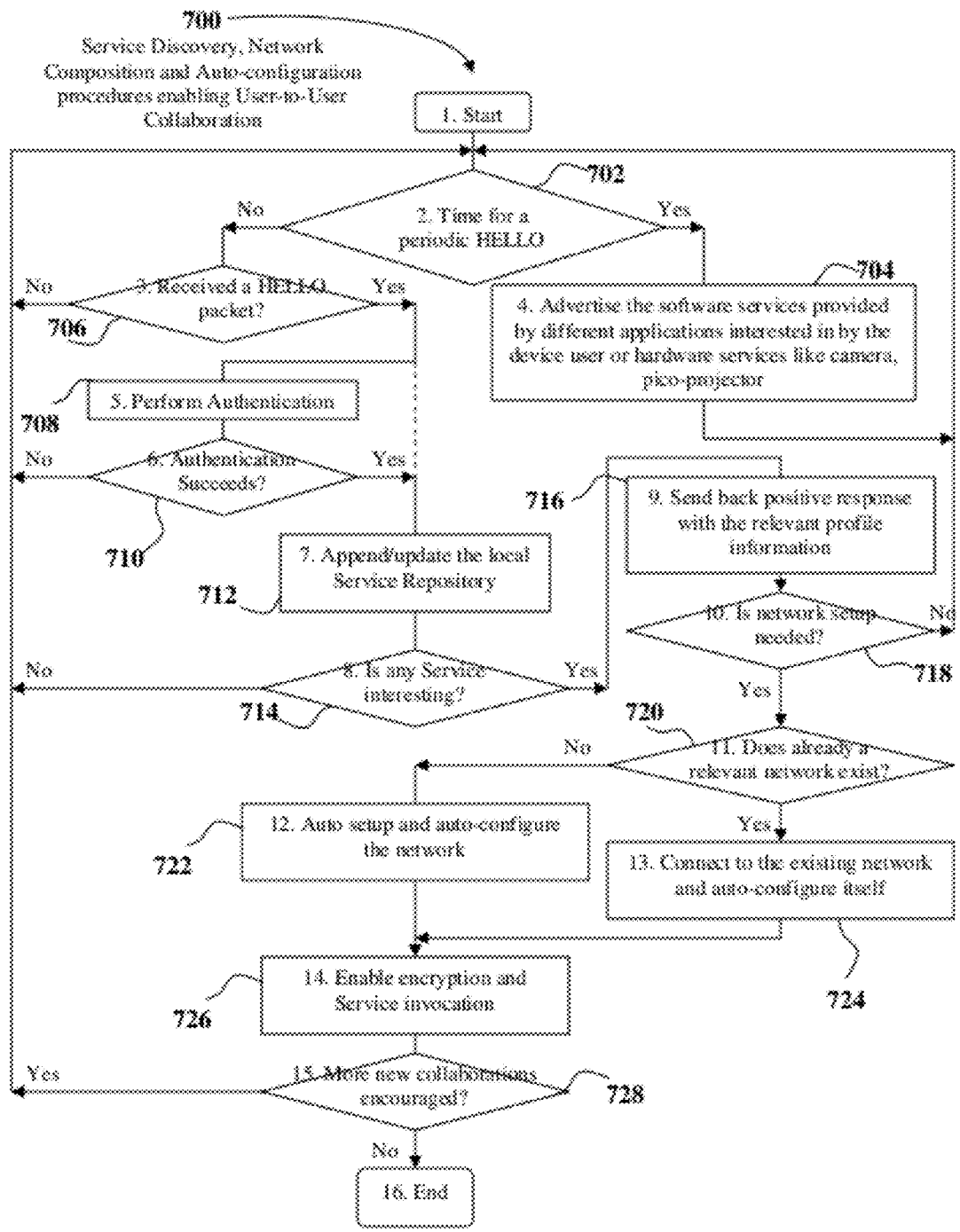
FIG. 9 shows proposed Service Discovery, Network Composition and Auto-configuration procedures enabling User-to-User Collaboration according to one embodiment of the present invention.

In order to enable user-to-user spontaneous collaboration 102 in a secure way, the proposed SD periodically disseminates HELLO packets (preferably at the middleware level) as depicted in FIG. 9. In addition one more protocol packet type is defined here; ALIVE. The purpose for the HELLO packet dissemination is to enable users to identify who are around in the near vicinity and what applications they are interested in, while the purpose of ALIVE packet is to let the other collaborated users know, once the task-centric network is composed, whether a participating user/device is still online (i.e., available within the radio range). In other words, until the needed task-centric network is formed, the Mobi_HobNob client module 140 of each device should periodically disseminate HELLO packets; on the other hand, once the needed network is formed the client module 140 of each device 12 will start disseminating the ALIVE packets. If a user has an active profile being set on the Mobi_HobNob client module 140 of his/her handheld device, the client module will trigger the SD to operate like a client from service discovery perspectives. Accordingly, the device has to start disseminating HELLO packets. Hence, the proposed SD does not involve any extra control signaling; instead, periodic HELLO dissemination is enough.

In order to minimize the possibility for the available channels to get congested, the HELLO dissemination is ideally limited to a single hop. This is because for the spontaneous collaboration to be effective in terms of getting the desired results (especially in the case of smart dating) and QoS while minimizing unnecessary wireless interference (in the case of multiplayer mobile gaming), closer proximity between two collaborators is preferred. On the other hand, in the future it is possible that the available bandwidth can be so abundant that multihop operation can be encouraged. Both the HELLO 800 and ALIVE 900 packets take the formats as exemplarily shown in FIG. 10 and FIG. 11 respectively.

In FIG. 10, the Profile-ID refers to the unique user identifier of the user of the device 12 that originates the HELLO packet 800, and the source identifier of a HELLO packet takes an arbitrary address—possible through the "autoconfig" protocol adopted (will be explained in subsequent subsections). In the case of ALIVE packet 900, the source identifier takes the resolved address, i.e., in case there is no duplicate address conflict, the source identifiers of both the HELLO and ALIVE packets from the same source takes the same value. With the service list, the source of the HELLO packet 800 informs the details of the services it provides. Each service is described by {{service}, {attribute1, attribute2, . . . }}, where service can be represented by a logical path name as described above and the second part consists of a set of attributes used to locate the desired service provider device. i.e., the service information is provided in terms of a service class, service attributes while adhering to the tree-based strategy explained before. The service list can be of variable length depending on the number and type of service provided by a device/user. Hence, it is up to the lower layers being employed to perform packet fragmentation/de-fragmentation operations.

In the envisaged operation the service information can be well represented by a Service ID, and this is enough to uniquely identify a particular service (However, service discovery using Service ID is valid only in semi-distributed and centralised SD modes as will be explained in subsequent subsections). In spite of the Service ID feature that minimises unnecessary exchange of service related information, in the case of fully distributed SD mode, Service IDs alone cannot be reliably used to uniquely identify services; and hence, full service information in terms of a service tree has to be exchanged.

More importantly, one of the key novel features of the proposed SD is that through the Mobi_HobNob client module 140 users are able to specify how long they will stay in the current location (especially if waiting in the airport lounge, train, restaurant and the like) with an objective to collaborate with users/devices that may stay in touch long. This is quite useful for playing multiplayer online mobile games, chatting etc. If the user is not sure about this, a default value of zero will be entered.

The "Mode Preferred" field of a HELLO packet 800 indicates the preference with regard to Mobi_HobNob client module's, especially SD's, operating mode and whether any infra-structure-based network 18 connection is preferred or not, once the network is formed for further collaborations. For example, in the case of multiplayer online mobile gaming, users may prefer to use short range wireless technologies for the operation of the service discovery and further collaborations. Hence, this can be one of the criteria employed by the service discovery protocol to identify the right peers; e.g., for instance only identify those who prefer ad hoc collaborations only and who do not encourage any infra-structure-based network connection.

In case, fully distributed approach is preferred, then no special authentication mechanism can be employed. In addition, it may be difficult to employ the envisaged asymmetric/ hybrid encryption mechanism as will be explained in subsequent subsections although symmetric encryption as in Bluetooth 2.1 is possible. Hence, fully distributed operation involves security risks and is opted for at the discretion of the users.

The online status indicates the packet originator's availability status for further collaborations. This takes either "FREE" or "BUSY" constant values. In certain application scenarios, the spontaneous collaboration requires a task-centric network to be formed; e.g., in the case of multiplayer game. Under such circumstances, it is better to specify the network identifier (e.g., Network ID) of the already or to be formed network. Given that there may exist more than one such networks within one device's radio range, it is better for each device 12 to know who belongs to which task-centric network. Before a task-centric network is formed, as it will be explained subsequently, the originator of the network will choose an arbitrary but unique value as the Network ID, and this value will remain the same until the task-centric network is deformed. In order to ensure a unique Network-ID while considering the possibility for the same device to be part of more than one task-centric network, the Network-ID takes the originator's Profile-ID as the prefix and unique service identifier (i.e., Service ID) as the suffix; i.e., Network ID=Profile-ID of the Originator+Service ID. The auto/self-configuration protocol/procedure 158 assigns Network ID to each task-centric network formed on demand. The way in which the Mobi_HobNob client module 140 finds the originator of a task-centric network will be explained in a later Section. The Service ID takes the ID of the service for which the task-centric network 14/16 is formed. In the case of the fully distributed mode, it is really challenging to guarantee that a unique Service ID can be agreed in advance among devices. Hence, the originator chooses a random number to be added to the prefix in order to generate the Network ID while the Service ID of the packet is not used. Depending on the services/applications invoked or the special interest groups/forums for which the network 14/16 is to be formed, the "How many more peers" field indicates how many more peer devices are expected for the task-network 14/16 formation. For instance, in the case of a 5-player interactive mobile gaming 112, if only (say) 3 peers have so far formed and joined a network identified by an Network ID identifieir1, the "How many more peers" field will carry a value of 2. Accordingly, once the network 14/16 is fully formed, the devices 12 may start disseminating ALIVE packets 900 instead of HELLO 800 unless otherwise stated explicitly. In case, where network is formed as part of a very open special interest group, the "How many more peers" field will take a value of infinity. In the latter case, devices 12 that have already become member of such a special interest group/forum shall continuously disseminate HELLO packets 800 periodically instead of ALIVE packets 900.

The HELLO/ALIVE packets are normally broadcast, and hence the destination address need not be specified. The frequency at which HELLO/ALIVE packets needs to be disseminated is a difficult design decision. This is because more often the device 12 disseminates the HELLO/ALIVE packets, greater the accurate up-to-date information other devices will have about one another. Hence, in a very dynamic environment where devices' relative mobility with respect to each other is high, the frequency of HELLO/ALIVE transmission should be high. On the other hand, this will in turn have a bad impact in terms of the wireless interference it may cause and the rate at which it will drain the battery energy of each handheld device 12. Hence, a compromise decision needs to be taken in terms of how often a device is allowed to disseminate HELLO/ALIVE packets. Although the default value for every HELLO interval per device is 2 seconds, it is left at the user's discretion; hence the user can vary this to suit one's life style in the main profile window as shown in FIG. 4.

In the case of Bluetooth 194, ALIVE packet 900 dissemination is redundant, because Bluetooth 194 has periodic KeepAlive message dissemination for the same purpose. Hence, rather than making a redundant attempt, the Mobi_HobNob client module 140 will make use of Bluetooth's KeepAlive messages to know the online status of collaborating devices/users. Further, once a network 14/16 is formed and collaborating devices 12 actively exchange packets (especially in the case of multiplayer mobile online gaming) using the short-range radio communication facilities, the ALIVE packets 900 can be piggy-backed onto the payload packets or the client module 140 running on each device 12 will deduce the online status of the neighbouring devices from the received packets source identifier (i.e., source IP address).

The protocol operation common to all three modes is illustrated using FIG. 9. The process 700 begins at decision block 702 where it is checked whether the next HELLO packet 800 from the device 12 is due for transmission. As mentioned before, every user device 12 that has active profiles initiates a HELLO dissemination advertising the services it offers while seeking the relevant peers (i.e., service providers) for an active spontaneous collaborations. For example, a user A may be interested in smart dating 108 and playing mobile online gaming 112 while his/her handset 12 has a pico-projector which other's may use if needed. Hence, he/she seeks users in the near vicinity, who may match his dating profile or who may be interested in playing a multiplayer online gaming or using the pico-projector. Hence, on receiving the HELLO packet 800, user B performs an authentication to see whether it is safe to collaborate (i.e., operation 6 of FIG. 9) with user A.

In the case of fully distributed approach, this is left with the user's discretion as there is no way to check the authenticity of users. This is because the service discovery operates in a fully standalone MANET mode without having the ability or wishing to contact the centralised database 22 and the associated Public Key Infrastructure (PKI). If the user ignores this authentication, then the client module 140 running in the local device 12 (i.e., user B's) will append/update the local service repository with services offered by the originator (i.e., user A) of the received HELLO packets 800. If user B's device find any of the services offered by A interesting, B's device 12 will respond positively with relevant profile information of user B pertaining to the services being interested in. At the discretion of the user, personal information such as photographs and business cards indicating contact details for further collaborations can be exchanged.

Depending on the services being invoked, the client module 140 will decide whether a suitable task-oriented network 14/16 needs to be formed/composed unless it already exists—again a user has a control on this. If, on the other hand, a suitable network 14/16 already exists, a local decision will be made in relation to joining it. This part and how the formed network gets auto-configured will be explained in subsequent sections. Once this decision is made, depending on the preference of users in relation to further collaborations for new service invocations, the client module 140 will decide whether to continue or stop disseminating or listening to HELLO packets 800 by neighbour devices 12. For instance, depending on whether a user sets his/her online status to be busy or free, the SD can respectively abort on a temporary basis or continue the HELLO dissemination operation. However, the default setting enables a collaborating device 12 to simultaneously listen to HELLO disseminations by those which are not necessarily collaborating at the moment.

In the case of interactive voice, video sessions, port numbers being used along with the codec information have to be notified prior to any meaningful spontaneous collaboration. Under normal circumstances, the client module 140 takes care of this by using some default port numbers for the known application. On the other hand, for a new application that a user introduces, the recommended port numbers needs to be used. Normally, whenever a user introduces a new application, he/she has to register the important details namely port numbers, codec and other relevant information with the Mobi_HobNob's central database 22 by accessing the server 24 using existing web technologies as explained before. Other users can get such information by periodically upgrading the client module 140 and database, if their devices are "thick". If, on the other hand, a user introduces new applications locally in the handheld device 12 by configuring the client module 140 (this is possible with "Add New Application or Service" feature of the Mobi_HobNob client module 140), there is no way to inform other users regarding the important configuration details of the new services/applications introduced without accessing the centralised server 22. If this is the case, the SD is very robust that in a fully distributed mode, extra service configuration details can be exchanged using Mobi_HobNob_QUERY and Mobi_HobNob_RESPONSE packets as shown in FIG. 12. The Payload_Type of FIG. 12 can either be Mobi_HobNob_QUERY or Mobi_HobNob_RESPONSE. This packet contains the Profile-ID of the creator and the Profile-ID to which the packet is destined. Depending on whether the packet is created to invoke either a service-related query or a service-related response, relevant information will be passed on in the fifth field of the packet shown in FIG. 12. Unicast can be used for the QUERY/RESPONSE message 1000 exchanges. With this, the proposed SD mechanism shall provide a mechanism to incrementally discover information about the services provided by a device as schematically shown in FIG. 13. This is economical and efficient, as devices 12 need not exchange service-related information unless otherwise necessary.

With the profile-based Mobi_HobNob secure spontaneous collaboration framework 10, it is also possible for a user to interact only with a certain peer group by appropriately setting the filtering criteria for spontaneous collaborations and interactions. For instance, if a medical student wants an answer for a question, he/she can send the query to those who are medical professionals. The peer/service discovery mechanism 144 is robust and versatile enough to identify the nearby users who can satisfy certain criteria. As explained before, this is possible with the dissemination of HELLO packets 800. An alerting mechanism (i.e., beep) is incorporated to notify a user when a matching profile is around in the near vicinity, especially in the case of smart dating.

The proposed middleware 140 is robust and capable of switching the underlying radio technology 180 (i.e., short-range communication only) being used dynamically in case the first service/peer discovery process is unsuccessful; for instance, device A may use Bluetooth 2.1 initially and later it may switch to IEEE 802.11g and so on provided it supports the technologies it intend to use.

Since this fully distributed service discovery strategy employs extensive flooding, it can operate well in small networks but incurs heavy control traffic in large-scale networks. As such, this patent also proposes two more service discovery mechanisms tailored to large-scale ubiquitous environments.

Mode B: Semi-Distributed Service Discovery Protocol for User-to-User Collaborations:

Semi-distributed SD operation is ideal for a user who is concerned both about collaborating with strangers and maintaining connections with the infra-structure-based networks 18 for spontaneous collaborations. This is possible with a "thick" handheld device 12 that has amble memory footprint to maintain a local database and periodically synchronise it with the Mobi_HobNob's centralised database 22. This database contains information regarding the Profile-IDs and service profiles of other users, their public key assignments, currently existing applications/services/forums and special interest groups identified uniquely by a Service ID and other important information as identified throughout the patent. However, during the course of updating the databases and storing locally in a handheld device 12, proper existing encryption methods are used such that details about other users are not available to non-owners; i.e., although user A's handheld device 12 contains profile details regarding user B, such details are not visible to user A but to his local Mobi_HobNob client module 140. With this approach, total privacy about a user is ensured. However, it is out of scope of the current patent to specify how such privacy is ensured.

This is very similar to the fully distributed SD operation as explained previously. Hence, service discovery starts by a HELLO packet 800 dissemination as depicted in FIG. 9. In this case the service list of a HELLO packet 800 of FIG. 9 does not need to include the full description of services in terms of a tree-based structure; instead, a Service ID per service is sufficient. This aspect in turn has a positive impact on the protocol's control overhead, as the size of each HELLO packet 800 will be sufficiently minimised.

Accordingly, on receiving a HELLO packet 800 of user A, user B will check the Profile-ID in the local database and determine its authenticity using the authentication mechanism to be described later. Once successfully authenticated, the Mobi_HobNob client module 140 running locally in handheld device 12 of user B will consult again with the local database to check whether there is a match in terms of any application, service, or special interest forum/group being common to both users A and B. If there is any match, a positive response will be sent by user B. All operations will then follow as shown in FIG. 9. The main difference between the fully distributed and semi-distributed service discovery protocols is that in a semi-distributed SD, two-way authentication is performed before the Mobi_HobNob client module 140 running on both devices 12 decide whether it is secure to collaborate spontaneously. The other difference is that the QUERY/RESPONSE 1000 mechanism is used only occasionally in the semi-distributed SD operation, as the local database is supposed to contain almost every service and the corresponding configuration details. However, this depends on how well the local and the central databases 22 are synchronised. If they are not, the participating devices 12 can either check with the central database 22 for determining the authenticity of users and getting the necessary service invocation 160 related configuration details by establishing connection via any infra-structure-based 18 network if that is possible or use the QUERY/RESPONSE mechanism in a very peer-to-peer manner as explained before for exchanging the service configuration details. In essence, the objective of the semi-distributed approach is to limit the unnecessary control signaling related interactions either with any of the infra-structure-based 18 networks or with the other participating handheld devices 12 by keeping as up-to-date database as possible locally.

With this strategy of operating the profile-based Service Discovery protocol 144 in a semi-distributed mode, unnecessary control signaling related packet dissemination with the other collaborating devices 12 that should otherwise be inevitable for the necessary service discovery operation and getting the required service invocation 160 details can be significantly reduced. This will in turn conserve battery energy and wireless bandwidth—so congestion on the ISM band can be minimised. Given the congestion is limited, the waiting time for the necessary response can be minimal.

Mode C: Centralised Service Discovery Protocol for User-to-User Collaborations:

This is very similar to the Semi-Distributed strategy in terms of the way attempts are made to limit the signaling overhead in the task-centric network 14 to be formed (i.e., limit the control information dissemination among the participating handheld devices 12). It follows all the steps involved as depicted in FIG. 9. Hence, it is very similar to the semi-distributed SD. However, the main difference is that on receiving the HELLO packet 800 of another user, if further information is needed in order to authenticate the user or get the necessary service invocation 160 details, the Mobi_hobNob client module 140 will establish a communication channel with the server 24, and the server application 28 which in turn will interact with central database 22 and the PKI through any of the infra-structure-based networks 18. Hence, again this centralised SD protocol operation attempts to limit the control signaling related packet dissemination with other collaborating devices 12; and thus saves energy and wireless bandwidth on the ISM band and minimise the time needed to set up the task-centric network and the service invocation 160 time. This, in turn, will minimise the congestion on the communication interface of first type (that normally operates in the ISM band). In other words, both the semi- and centralised SD protocols achieve the same objectives (i.e., limiting unnecessary control signaling with the participating devices 12 in the service discovery process). However, the ways in which both achieves the same objectives are different; for instance the centralised SD protocol prefers to communicate with the central database 22 via the communication interface of second type for further information on a demand basis whereas the semi-distributed SD protocol tries to get the same information from the local database.

Another possible way in which the centralised SD protocol is different from the other two modes is that the centralised SD protocol can use a prediction in its service discovery process 144 again at the users' discretion. For some of the envisaged application as supported by the Mobi_HobNob client module 140, it is preferred to have collaborations for long-durations; especially when playing multiplayer interactive online games 112. Hence, it is most appropriate for the SD protocol of user A who is interested in a mobile game to identify the right peer that can stay longer with user B. This is where prediction becomes necessary, and the availability prediction mechanism 152 attempts to predict how long another user B who is in the vicinity of user A can stay together; i.e., if they are moving, their relative velocities are ideally zero (very minimal) so that both can be within each other's radio range. This prediction is possible by observing a given user's spontaneous collaboration pattern/history—history is collected using the history services 148 functionality.

Users tend to have favourite and/or habitual spontaneous collaboration pattern, and those can be learned. The envisaged spontaneous collaboration occurs as part of the daily life of a person. Hence, it is better for the availability prediction mechanism 152 to know the habitual pattern of a user. Learning aids decision-making when reappearance of those patterns is detected, given that "history repeats itself" [7]. The availability prediction mechanism 152 of Mobi_HobNob client module 140 exploits this, and attempts to derive probabilistic prediction of particular user's availability for a spontaneous collaboration by utilizing his/her accumulated collaborating-history. This history can be maintained on an hourly, daily, weekly, or a monthly basis in Mobi_HobNob's centralized database 22c. The server application 28 coordinates with the client module 140 in order to constantly maintain the spontaneous collaboration history of every user in 22c.

This patent does not propose a new prediction scheme to determine the availability time; instead it makes use of an already proposed strategy as presented in [7] with some modifications. It is motivated by computational learning theory, which has shown that prediction is synonymous with data compression. The spontaneous collaborating history of a user is represented by a string $t_1, t_2, t_3 \ldots$ of symbols where $T=\{t_1, t_2, t_3 \ldots t_n\}$ is the set of continuous spontaneous collaboration period and $t_1$ denotes instantaneous time or time-window at/within which habitual data is collected, and such strings are generated using a time-based tracking schemes [7]. The goal of this strategy is to construct a universal predictor or estimator for the user's availability for a spontaneous collaboration model. The proposed scheme attempts to create a dictionary of availability of a user in terms of time-duration, which can be treated as character symbols, and uses the dictionary to gather statistics based on collaborating history contexts, or phrases.

The intended availability prediction algorithm 152 is based on the Ziv-Lempel algorithm (LZ78) for data compression [7]. In addition to making predictions about the availability for a future collaboration of a particular user, this model is used by each collaborating user to maintains its habitual history (i.e., every day's) in the central database 22. The history of each user identified through a Profile-ID is thus maintained in the central database 22c by the server application 22c, and the predictor is run again centrally whenever a user A contacts the central server on receiving a HELLO packet 800 from another user (say user B) to predict the availability of user B. The prediction algorithm 152 will be run only when there is a perfect match between users A and B in terms of the services being interested in.

Given that the centralised SD communicates with the Mobi_HobNob's central database 22 on a demand basis, it is more appropriate to use this prediction mechanism 152 only when the user is interested in this centralised SD mode. However, the predicted results of a user will be available to every other collaborating user, only if there is a perfect match in terms of the services/applications/forums/special-interest-groups being interested in. As shown by the clock icon in FIG. 16, user A can see how long user B (for instance Jay of FIG. 16) can be available for spontaneous collaboration. In case, user B specifically enters a value before disseminating a HELLO packet 800, this entered value will supersede the predicted value and this is the information that is available for other users. Again users have controls over their availability information being available to others, and the use of such information of another user in the service discovery process by the service discovery initiator. This second aspect is important, as users do not sometimes want such predicted information being used as one of the criteria of the proposed service discovery protocol in its attempt to choose the right peer user. However, the richer the availability information that the central database 22c possesses in relation to a user, more accurate the prediction will be.

Another added feature of this Mobi_HobNob client module's 140 centralised based operation is the possibility for the SD to avoid problematic peers/devices/users based on the community trust building process being possible here. Accordingly, malicious behaviours of devices/peers/users can be identified and reported to the central database 22 (more specifically to 22b/22c), and this will help spontaneous collaborators to avoid problem creating Profile-IDs. This is because Profile-IDs are unique to users and the Mobi_HobNob client module 140 uses Profile-IDs for its envisaged operations, although such an Profile-ID information regarding another user B is not visible to user A.

Mode D: Centralised Service Discovery Protocol for User-to-Device Collaborations:

The service discovery for user-to-device collaborations 104 enables handheld devices 12 to make connections to various fixed devices 24 (e.g., printer) and mobile devices (e.g., pico-projector or camera of another device) on the fly depending on dynamic demands. The fixed device 30 as denoted by a printer in FIG. 14 can be a TV, Smart home Central controller, overhead projector, printer, burglar alarm controller, door/gate controller and similar devices. As shown in FIG. 2 and FIG. 3, in the envisaged operation, handheld devices 12 should be able to connect to fixed devices 24 and mobile devices such as a pico-projector and camera of another handheld device 12 etc. In the near future, it is envisaged that these fixed devices 24 will be connected to broadband, and thus having connectivity to the central server 24 having the Public Key Infrastructure (PKI) functionality, and have enough processing power and memory footprint to run the Mobi_HobNob client module 140. In addition, these fixed devices will be equipped with the communication interface of first type (only 182, 184, 186, 188, 190 and 194) for handheld devices 12 to spontaneously collaborate with them. One application scenario would be when a user needs to take a printout urgently from his/her handheld device 12 and is not sure about the whereabouts of the nearby printer 24 in a shopping mall. The envisaged user-to-device service discovery protocol will find the neighbouring printer for the user. In case its location is needed, it can also be obtained through the QUERY/RESPONSE mechanism 1000 in terms of the floor number, shop number etc.

Figure 14:
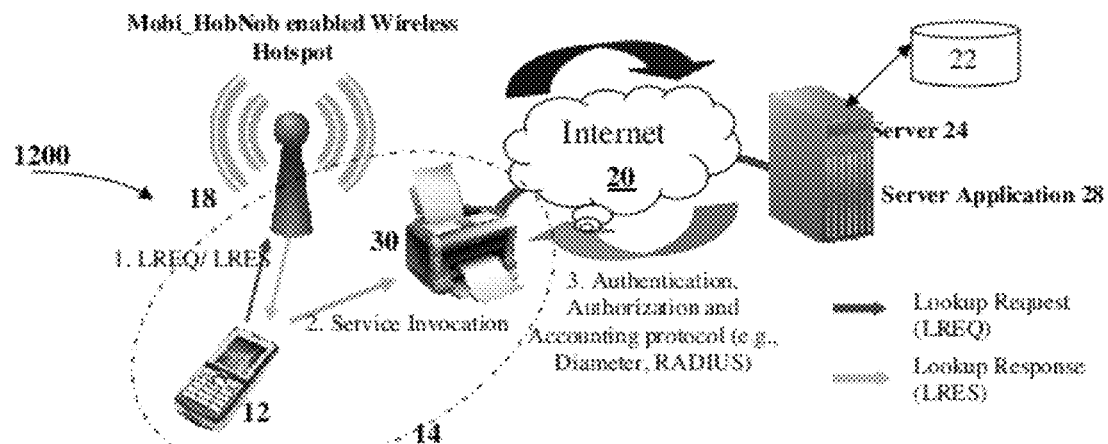
FIG. 14 exemplarily shows User-to-Device Collaborations enabled through the Centralised Service Discovery Strategy according to one embodiment of the present invention.

The envisaged operation is illustrated in FIG. 14, and it is possible by having the limited Mobi_HobNob client module 140 functionality (i.e., only the server functionality from SD perspectives, and thus possesses a local service repository and is capable of participating in the service discovery process with the limited server capacity) installed in the local wireless hotspots (e.g. WiFi) for instance or the fixed device (e.g., the printer in FIG. 13) itself has the limited functionality of the Mobi_HobNob client module 140 and is equipped with a transceiver providing the communication interface of first type (i.e., short-range wireless communication capability). The Service repository possessed by the Mobi_HobNob client module 140 installed in the local wireless hotspots needs to be supplied with all the service providers' and the required service configuration details. Once the service provider's information is obtained, the Mobi_HobNob client module 140 running locally in the handheld device 12 will prompt the user for establishing the necessary connection directly with the service provider (i.e., printer in this example). If wireless communication is possible, the handheld device can upload the document/picture to the printer 24 and take the necessary printouts. The printer is connected to the server 24 supporting PKI via Internet, and hence is able to authenticate the user and if necessary charge the user for the usage of the printing services in case Mobile Wallet is possible. This is again facilitated through the PKI functionality offered by the Mobi_HobNob central server 24 and the associated server application 28.

Another related and possible usage scenario is where a handheld device 12 in a shopping mall tries to find the closest toilet/NEXT-outlet/police-station/help-desk/security and related services. This is possible through the proposed user-to-device collaboration 104 enabled through the respective SD. The same type of operation is expected when a user would like to connect to devices like TVs, Smart home Central controllers, overhead projectors, printers, burglar alarm controllers, door/gate controllers etc. using his/her handheld device 12. Another possibility is for a user using his/her handheld device 12 to inquire about the local bus, train and flight time tables by connecting to the nearest bus/train/flight terminal, which is equipped with a wireless transceiver to support the communication interface of first type.

In this scheme, whenever a communicating device 12 is in search of a particular service and does not have any clue as to which devices that provide it, it will initiate a service lookup (discovery) process, as illustrated in FIG. 14. In this process, the client device 12 which is in a need of a particular service disseminates a Lookup REQuest (LREQ) message preferably at the middleware level with the following information used to describe the service being looked up {{service}, {attribute1, attribute2, . . . }}, where service can be represented by a logical path name as described above and the second part consists of a set of attributes used to locate the desired service provider node. Again Service ID can be used for an economical/efficient/effective and fast service discovery.

The envisaged network can be single hop or multiple hops—the latter case is very similar to mobile ad hoc networks where devices can act as relays. For a very practical case, a single hop limited network is assumed, and in which the envisaged operation does not expect any communicating device to relay the LREQ packets on behalf of another. On receiving the LREQ, any service provider (e.g., printer itself of FIG. 14 if it has wireless short-range communication capability) satisfying the service requirements as indicated in the LREQ or any intermediate node (e.g., Wireless hotspot possessing only the proposed SD functionality) having fresh enough information regarding the devices 24 that provide the service being looked up will respond with a service response (LRES) message being passed back to the LREQ source. Note that all this functionality preferably takes place at the middleware level and via the communication interface of first type.

It is inevitable that under normal circumstances the proposed service discovery process employs flooding at the middleware level, and flooding can easily saturate the wireless medium. More importantly arbitrary flooding in an environment employing the IEEE 802.11 distributed coordination function (DCF) as the underlying MAC will not work due to the potential presence of hidden and exposed terminals [8]. Although flooding in certain situations is inevitable, the proposed strategy makes an attempt to limit its usage. For this purpose, the SD of the Mobi_HobNob client module 140 exploits the promiscuous listening functionality, whereby a handheld device 12 overhearing a LRES transmission makes a corresponding entry in its own lookup server and such entries are subject to a timeout mechanism. With this strategy, whenever a handheld device 12 that previously overhead the LRES belonging to a different service discovery process requires to invoke the same services, it can get the necessary service provider along with the service configuration details locally from its own service repository before the time out.

The typical objective of employing such promiscuous listening functionality is to minimize unnecessary superfluous flooding of control signaling which would otherwise take place.

Here the SD follows Jini only from the service invocation perspectives such that lookup services do not just store service information, but rather save a piece of software that contains all the "intelligence" to execute the required code locally or remotely. Such pieces of software are known as proxies and they are the key to the dynamic use of drivers at runtime.

Figure 15:
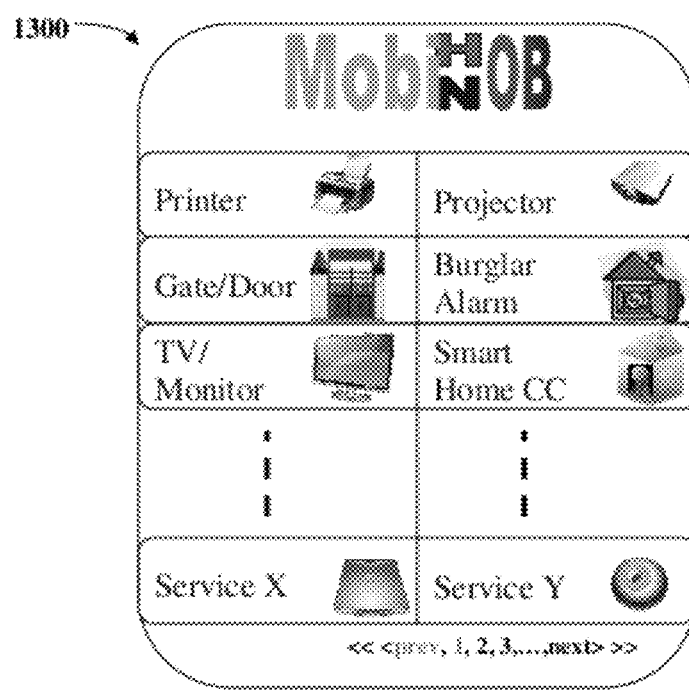
FIG. 15 illustrates one exemplary graphical user interface enabling manual triggering of Service Discovery for Spontaneous (mainly User-to-Device) Collaborations according to one embodiment of the present invention.

Service discovery for the user-to-device collaboration 104 can be triggered either automatically by the application itself or the user manually triggers the request by opening the window 1300 as shown in FIG. 15 and clicking the relevant icon. The service list as shown in 1300 of FIG. 15 is not exhaustive; meaning that it will grow depending on the availability of future services and trends. This is a reactive approach. On the other hand, as it will be explained in subsequent sections, the Mobi_HobNob client module 140 proactively lists down the services available in the handheld devices 12 carried by users in the local neighbourhood, so that the user can invoke the necessary services by clicking the appropriate icon in the screen as shown in 1400 of FIG. 16—however, this will not list down the services provided by the standalone devices such as printers, projectors, and the like that are not part of any handheld device 12.

3) Mutual Authentication and Encryption

This patent does not aim to propose any novel authentication or encryption mechanisms. Instead, it uses public key cryptography for two-way (or mutual) authentication purposes in a novel way in order to enable the envisaged spontaneous collaboration. With this arrangement secure spontaneous collaboration among strangers is possible for the first time in a ubiquitous communication and computing environment. Please note that public key cryptography is used for the purpose of mutual authentication only by peer entities as part of the session setup. Once mutually authenticated, any symmetric, asymmetric or hybrid encryption technique can be used by the collaborating devices for establishing secure communication channel as illustrated by operation 14 of FIG. 9.

Two-way or mutual authentication and non-repudiation are important, because these allow two strangers to communicate privately but securely in a peer-to-peer manner as envisaged by the proposed methodology, the system and the secure spontaneous collaboration framework 10 of the present invention. Accordingly, whenever a user registers with the Mobi_HobNob's central database 22 and activates the main profile after having used the main profile form as exemplarily shown by 200, he/she will be assigned a unique alphanumeric Profile-ID, which is needed for the envisaged operations of the Mobi_HobNob client module 140. This is because the Mobi_HobNob client module 140 and the server application 28 use a Profile-ID to uniquely identify each user and uses it as an index. Profile-IDs are not used by humans and hence Profile-IDs of other users are not visible to humans, and it is the proposed client module 140 and the server application 28 that solely uses it for enabling user-to-user/device collaborations. In other words, a user knows his/her own Profile-ID, but not those of others. Each unique Profile-ID binds user's identity. Together with a Profile-ID, each user is assigned two keys: i) a public key, and ii) a private key—these details along with user-specific information such as those exemplarily shown by 200 are stored in the central database 22 (or specifically in the AAA database 22d). In addition, in order to further ensure and enforce mutual authentication and non-repudiation, credit/debit card details or any other relevant detail of the user can be gathered and double checked with the provider of the credit/debit card or the third party at the time of assigning the Profile-ID to the user.

In order to avoid man-in-the-middle attack, credibility of users' public keys has to be ensured. For this purpose, the use of Public Key Infrastructure (PKI) concept is used whereby the central server 24 and the associated server application 28 take an additional role of a PKI. A PKI is an arrangement that binds public keys with respective user identities (i.e., Profile-IDs) by means of a certificate authority (CA). Each user is identified by his/her unique Profile-ID in each CA. The binding is established when a user initially registers with the Mobi_HobNob central database 22. The PKI role that assures this binding is called the Registration Authority (RA). For each user, the user identity (i.e., Profile-ID), the public key, their binding, validity conditions and other attributes are made unforgeable in public key certificates issued by the CA. With this arrangement, each user's public key will take the form of a public key certificate (or identity certificate) which is an electronic document. Each identity certificate incorporates a digital signature to bind together a public key with a Profile-ID. The certificate can be used to verify that a public key belongs to an individual user/device. The private key is kept secret, while the public key may be widely distributed through the Mobi_HobNob's central database 22 that also performs certificate validity through the Validation Authority (VA).

With this arrangement, an originator/sender of a packet (e.g., HELLO) needs to sign with his/her private key. The received packet can be verified by anyone who has access to the sender's public key, thereby proving that the sender had access to the private key (and therefore is likely to be the person associated with the public key used), and the part of the message that has not been tampered with. This is shown by operation 6 of FIG. 9. The Profile-ID of a user/device can be used as an index to find the corresponding Public key of a particular user. This way mutual or two-way authentication is performed by spontaneously collaborating users/devices.

In the case of semi-distributed operation of the Mobi_HobNob client module 140, if intermittent communication with the central server 24 and the associated database 22 or PKI is impossible or not preferred, the local database has to contain the public key information of other users in addition to the total profile information. This information pertaining to each user is referenced by the user's Profile-ID and such information is only available to the Mobi_HobNob client module 140. In other words, the Profile-ID of a user is not visible to another user, instead, a friendly name will appear. In both centralised and semi-distributed mode operations of the client module 140, any symmetric, asymmetric or hybrid encryption technique can be employed. In the considered semi-distributed operation, it is assumed that the local database is synchronised with the central database 22 in terms of the contents and accuracy or intermittent interaction with the central database 22 via any infra-structure-based network 18 is possible. Hence, with this arrangement the proposed methodology, the system and the secure spontaneous collaboration framework 10 of the present invention attempt to ensure identification and authentication of participating peers, confidentiality during transmission, integrity of transmitted information, attribution ("non-repudiation") of interactions. For certain user-to-device collaborations 104 as exemplified by 1200, the PKI also provides Authentication, Authorization and Accounting (AAA) services and supports relevant protocols such as DIAMETER [9] and Diameter Credit-Control Application (DCCA) [10]. Hence the client module 140 as well the server application 28 has the AAA functionality 156. The relevant information needed for Authentication, Authorization and Accounting (AAA) services is stored in AAA database 22c.

On the other hand, in the case of the fully distributed operation of the Mobi_HobNob client module 140 where public key based seamless authentication is really difficult, spontaneous collaboration is left at the users' discretion. Hence, if a user selects a fully distributed operation of the Mobi_HobNob client module 140, seamless mutual user authentication is disabled by default. This is also the case with the semi-distributed mode operation of the client module 140 when the local database does not possess any of the profile information of another collaborating user/device and intermittent interaction is impossible via any infra-structure-based network 18. Although mutual authentication is very difficult in such cases, symmetric encryption can be used to establish relatively secure communication channel. However, this patent does not propose any authentication mechanism for a pure standalone MANET operation (i.e., fully distributed operation of the Mobi_HobNob client module 140). The spontaneous collaboration in this fully distributed mode is at the user's discretion, as it involves security threats.

In the case of encryption, if such functionality is already provided by the underlying radio technology like Bluetooth or any other protocol, it is redundant for the client module 140 to provide this. The Mobi_HobNob client module 140 is capable of knowing this by interacting namely with other relevant protocols or radio technology being employed. The use of IPSec-tunnel is also not ruled out.

4) Self-Organisation of the Composed Network

The spontaneous collaboration often involves the formation of a network that is of ad hoc or hybrid in nature with no or a little reliance on any centralised infrastructure 18 respectively. In this network, each device 12 needs to have an address for a meaningful communication. Given that IP networking hides the underlying low-level complexities, the proposed self-organisation protocol/procedure 158 allows each participating device 12 to have a unique (not globally unique) IP address assigned to the communication interface of first type as a pre-requisite to any spontaneous collaboration. Accordingly, in such cases, each participating device 12 attempts to select a random address (on network 169.254/16 in case of IPv4, or on prefix MANET_INITIAL_PREFIX in case of IPv6). This is analogous to the way the Autonet allocations are performed as proposed in the Zero configuration (zeroconf) working group [11]. The proposed methodology, the system and the secure spontaneous collaboration framework 10 of the present invention, however propose, a zeroconf mechanism with substantial modifications to address some of the security threats and to allow the envisaged operations of the Mobi_HobNob client module 140.

As shown in FIG. 9, self-organisation protocol/procedure 158 is performed as part of the Service/peer discovery mechanism 144. In the envisaged operations there is no need for any special address resolution protocol (ARP) functionality to resolve any duplicate address detection (DAD). Instead, the periodic HELLO/ALIVE packet dissemination, which is meant for different purposes as explained in previous sections, is itself enough to resolve the DAD problem partly. As in the case of Zero configuration networking, a device 12 needs to assign itself an IP address on the communication interface of first type. Operations 12 and 13 of FIG. 9 are responsible for this action in the case of Mobi_HobNob client module's 140 envisaged operation. Accordingly, before a device 12 assigns itself an IP address, it has to promiscuously listen to the communication interface of first type to look for any possible DAD. This is possible by listening to other users'

HELLO/ALIVE packet dissemination and QUERY/RESPONSE 1000 and locally caching the already used IP addresses (often after the authentication process when a HELLO/ALIVE packet is received from a neighbouring device). A user's device 12 that is interested in a spontaneous collaboration assigns itself an address at random from the above stipulated range and includes it in its periodic HELLO/ALIVE packet dissemination. Please note that Address is assigned to each Profile-ID of a user/device although a friendly name appears on the screen, and under no circumstances do users manipulate with Profile-IDs. But the Mobi_HobNob client module 140 uses the Profile-ID as the reference for all communications locally and those with the central database 22.

The self-configuration protocol/procedure 158 of the Mobi_HobNob client module 140 attempts to make this address selection process random by using the unique Profile-ID and time of the day as seeds. With this strategy to make the selection method sufficiently random, address related conflicts/clashes are very unlikely considering that there are $2^{16}$ possible addresses to choose from in the case of IPv4, and the number of participating devices in such an ad hoc collaboration seldom exceeds this number within a radio-range. On the other hand, there is always the chance of an addressing conflict despite the initial probing. This can occur if probes of a user/device are lost or if another user/device is not obeying the protocol or is even acting maliciously to deny anyone an address. Given that HELLO/ALIVE dissemination is single-hop limited, there is a possibility for more devices, which belong to different spontaneous network groups and are not within each other's radio ranges, to have the same address. This is problematic because another intermediate device that can belong to these different spontaneous groups simultaneously will have difficulty communicating with the devices having the same network identifier (i.e., IP address). The proposed self-configuration procedure/protocol 158 specifies a number of steps to attempt to resolve accidental conflicts, but the protocol is not resistant to deliberate denial of service attacks.

Address resolution is possible with the use of QUERY/RESPONSE mechanism 1000 as explained before. Unlike in ARP, the self-organisation protocol/procedure 158 of the Mobi_HobNob client module 140 does not use "Who has" requests; instead, periodic HELLO/ALIVE packet dissemination meant for different purposes helps nodes to detect duplicate addresses within the local radio-range. The self-configuration protocol/procedure 158 of the Mobi_HobNob client module 140 uses Timer-based Duplicate Address resolution. This is possible with both the fully distributed and the centralised mode operation of the Mobi_HobNob client module 140. In case the fully distributed operation is assumed whenever a duplicate address is detected, devices have to resolve it based on how long each device has been using the address for. The longer the duration a device A has been using the same address for when compared to another device B, the more likely device A has to retain the same address while requiring device B to change its address. This solution is not perfect as a malicious device may interfere with other people's spontaneous collaborations by pretending that it has been using a particular address longer than one of the other devices that have been in collaboration with another group of nodes. To address this security threat a centralised duplicate address resolution strategy is proposed whereby once a device has started using a zeroconf address it has to register its address with the Mobi_HobNob centralised database 22—more specifically these addresses are stored by the server application 28 in Self-organisation Network (SoN)

database 22e at the request of a client module 140 running on a device 12. Each entry will be accompanied by an associated time-stamp at which the registration is performed with the central database 22. Accordingly, whenever a duplicate address is detected, it is up to the devices to contact the central server 24 and the associated server application 28 that will inquire the database 22/22e and will resolve the DAD based on the time duration of the address usage by each device 12. The same QUERY/RESPONSE packet 1000 format as shown in FIG. 12 can be used for this purpose. This timer-based duplicate address resolution is still possible with the semi-distributed operation mode of the client module 140; for instance if no communication is possible with the central server 24, server application 28 or database 22e, the resolution method being applicable to a fully distributed operation can be used. On the other hand, any communication with the centralised server/server application/database 24/28/22 is possible, the resolution method meant for a centralised mode of operation can be used.

In the case of centralised operation, the central server/server application 24/28 cannot employ DHCP functionality as this way of address assignment does not work in the envisaged spontaneous collaboration. This is because users/devices are scattered around the globe and the number of users/devices will well exceed $2^{16}$. Hence it is difficult for having DHCP functionality to ensure unique address assignment even if the location information of each node is made available to the server/server application 24/28. For these reasons, a localised DAD and address resolution has to be in place. In case a device A detects that two devices B and C in its neighbourhood have the same address without B and C knowing this mainly because B and C are not within each other's range, and suppose device A knows the Profile-IDs of devices B and C, device A can report this to the server/server application 24/28. The server/server application 24/28 can communicate either with device B or C (central database picks the lowest Profile-ID) and get it to pick a different IP address. This operation is possible either in the case of centralised or semi-centralised operations of the Mobi_HobNob client module 140 if intermittent communication with the Mobi_HobNob centralised server/server application 24/28 or database 22 is plausible. On the other hand, in the case of fully distributed mode of operation where a reliance on any infrastructure-based network 18 is ruled out, device A has to perform the same operation as that normally done by the server/server application 24/28 in the case of centralised/semi-distributed operation. Accordingly, device A will choose the device having the lowest Profile-ID and communicate with it with an objective to resolve the duplicate address problem in a very distributed manner. In case more than two devices 12 have the same address, the same operation will follow incrementally. The QUERY/RESPONSE packet 1000 formats and similar mechanism as explained previously can be used for this purpose.

In case a device/user behaves maliciously, this can be notified to the central database 22 via server/server application 24/28, as a way to enable community trust building strategy. This will again be helpful in the service/peer discovery process to avoid problematic peers/users in the case of the centralised or semi-centralised operation of the Mobi_HobNob client module 140. Together with this and the authentication mechanism being applied before the self-organisation process as shown in FIG. 9, the Mobi_HobNob client module 140 can help reduce the security threats and malicious behaviour mainly in the case of centralised Mobi_HobNob mode of operation. This is also possible in the case of semi-distributed operation of the client module 140—however, it depends on how well the local database of each participating "thick" device compares with the central database 22 in terms of the contents and accuracy.

Similar IP address assignment and duplicate address resolution mechanisms can be used for multicast address assignment for the multicast group formed by spontaneously collaborating users. This is often required for spontaneous collaborations by users belonging to a special interest group/forum.

Although the proposed methodology, the system or the secure spontaneous collaboration framework 10 of the present invention makes attempts to minimise malicious device/user/peer behaviour and security threats possible through community-based trust building and centralised two-way authentication strategy as explained in previous sections, it is very difficult to completely avoid the security threats posed in such situations. This is because spontaneous collaboration is envisioned among complete strangers, and hence, the users have to jointly eradicate the anti-social behaviour.

5) Service Invocation 160

Once the Mobi_HobNob client module 140 running on a local user's device 12 has sniffed its immediate neighbourhood (i.e., radio range) through the Service Discovery 144 mechanism as explained before and discovered the services available, it will list down the details regarding the various types of interesting services/applications or special interest groups/forums available to the user. Profile-IDs are generally not shown; instead, friendly Mobi_HobNob names are used as shown in 1400 of FIG. 16. As it can be seen in FIG. 16, the Mobi_HobNob client module 140 will list down both the "online" and "busy" users along with the list of services/applications they provide and/or the available special interest groups/forums using friendly icons. It is up to the user to click the icon to invoke the service. On receiving periodic HELLO packets 800, the profile based service discovery 144 gathers enough information by contacting either the collaborating users/devices themselves directly and/or having intermittent communication with the central database 22 depending on the operating mode the Mobi_HobNob client module 140 has been configured to operate by the user. The service availability information will appear in the screen, only if the given user is interested in that particular application/service or special interest group/forums.

In case too many users in the radio-range provide any of the interesting services/applications or special interest groups/forums, only the most relevant services in terms of the user priority and related details will appear in the first screen 1400 while the rest will appear in the subsequent screens. A user can have total control over how this service availability screen 1400 should appear, and accordingly the user should be able to list down based on different search criteria—for instance, who is interested in playing a given game X for more than 30 minutes. The clock icon of FIG. 16 in every row specifies the mean average time period the particular user in the neighbourhood is available for any spontaneous collaboration. The types of possible service/application or special interest group/forum are not exhaustive, meaning that new application/service types or special forums can be introduced in the future by both the users and the middleware developers. For instance, the game icon is accompanied by a specific Game ID—whenever, new game is introduced/registered into/with the Mobi_HobNob central database 22/22a, it will be assigned a unique Game ID that is of an increasing order. This Game ID is used to uniquely identify a given game both by the user and the Mobi_HobNob client module 140. This is also true for any special interest group/forum. Hovering the curser over the icon can give basic description of the application/service/forum/group being part of 100 that enable spontaneous collaboration in the way intended. If a user would like to initiate a spontaneous collaboration, he/she has to first choose the appropriate user and then subsequently to select the application/service/forum/group that is part of 100. This selection can be automatic, if the user specifies his/her priorities in terms of the type of application being interested in and then specific criteria to choose the right collaborating user; for instance, the user can specify the gender, age-group, minimum time available for, etc., in order to select the right user automatically.

Figure 17:
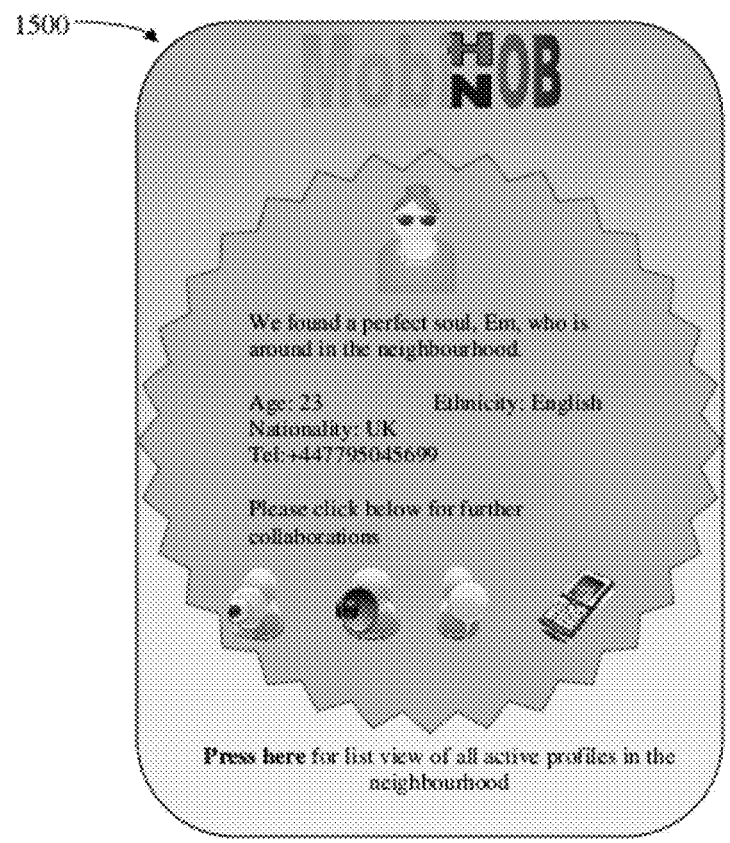
FIG. 17 illustrates one exemplary graphical user interface used for User

In the case of Smart Dating application 108, once a matching profile is found, a pop up message will appear with a beep on the handheld device 12 to draw the attention of the user. At the user's discretion, this message may contain the photographs and other important contact details of the matching profile. Suppose the current user A is interested in women of particular characteristics, whenever another user B having a matching profile comes in the vicinity of the former, the proposed service discovery mechanism 144 of the Mobi_HobNob client module 140 (irrespective of whether its operation mode is fully distributed, semi-distributed or centralised) can identify and notify the service invocation 160 entity of the Mobi_HobNob client module 140. Service invocation entity 160 will gather the configuration details either by contacting the peer device using the QUERY/RESPONSE message 1000 types as shown in FIG. 12 or the central server/server application/database 24/28/22 via any of the infra-structure-based 18 networks depending on the mode in which the Mobi_HobNob client module 140 is configured to operate. Once a user is alerted, he/she has the choice for further collaboration via online chatting or mobile call (via an infra-structure-based network; e.g., cellular) as shown in FIG. 17. In case a user prefers a mobile call for further collaboration, the call initiator does not have to enter the mobile number; instead, the client module is configured to get the necessary mobile telephone number or any other contact detail of a callee such as MSN ID, Skype ID landline telephone number, satellite telephone number and the like by inquiring the server application 28 by passing the Profile-ID of the callee so that the local client module 140 of the caller will initiate a call with little user input, as long as the callee has already agreed to this facility when registering his/her profile in the Mobi_HobNob central database 22. This often involves registering the mobile number or any other contact detail such as MSN ID, Skype ID landline telephone number, satellite telephone (e.g., IntelSat, Inmarsat and the like) number and the like—which is not available to other users, but only the client module 140 of users manipulate such personal information.

Figure 16:
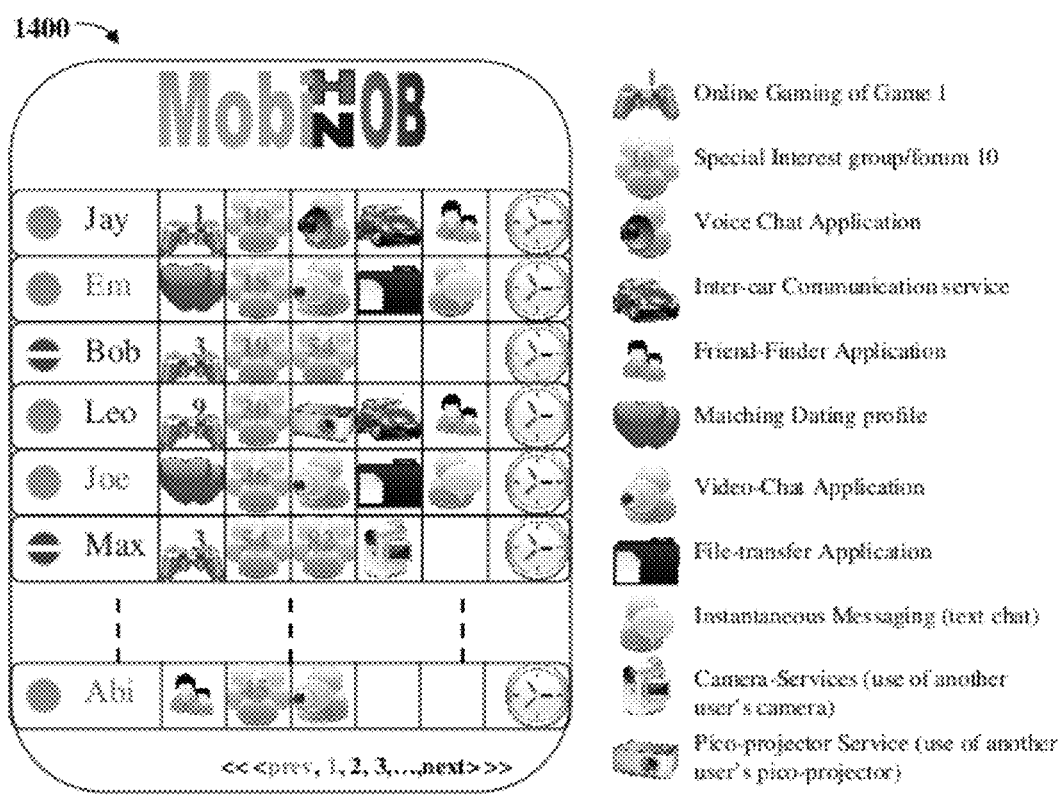
FIG. 16 illustrates one exemplary list view of the Service Availability and Provider information within a Radio Range according to one embodiment of the present invention.

Whenever, a user A wants to play a multiplayer online game 112 or initiate a multimedia chatting 110 or inter-vehicle interaction 114 application with another user B, user A has to click the relevant icon on the Mobi_HobNob window 1400 as shown in FIG. 16 or 1500 of FIG. 17. Once clicked, the other user B (can be more than one user though) will be prompted about this with a simple alerting window (e.g., User A wants to initiate a Multimedia Chat, do you want to connect—Yes/No) along with the information in relation to the originator of the task-centric network. On accepting it, a spontaneous collaboration between users is possible. On the other hand, user B can reject user A's invitation. The actual exchange of the invitation and the corresponding response is again made possible through the QUERY/RESPONSE mechanism 1000 as illustrated using FIG. 12. For this purpose, either JOIN, ACCEPT or REJECT message denominator is used as the payload type of the QUERY/RESPONSE packet. As mentioned before, it can be configured such that client module 140 can automate the task of peer/device/service discovery 144 and seamless network setup without requiring any such Yes/No user input.

There are two ways to use the Mobi_HobNob client module's 140 inter-vehicle interaction 114 facility. As it can be seen in FIG. 16, a user A can advertise his vehicle registration number, so that it will appear on the Mobi_HobNob screen 1400 of another user B, as long as user B has satisfied the filtering criteria as required by user A for such an inter-vehicle interaction 114 facility. In this case, by clicking the car-icon, user B can see user A's vehicle registration number. If needed, user B can contact user A. Other possible usage scenario is where user B cannot see user A's details in his Mobi_HobNob screen 1400 (mainly because, the ISM band is heavily congested and as a result the Service Discovery part is not working at the required speed). In this case, in order to use the inter-vehicle interaction 114 facility, user B has to enter the vehicle registration number of the other party (i.e., user A), and the Mobi-HobNob client module 140 will handle the underlying communication setup. At the discretion of the users, depending on the signal strength of the short-range radio technology, inter-vehicle interaction 114 is also possible via any infra-structure-based network 18, as long as this feature does not affect the privacy settings of the callee and provided that both users ticked yes for such collaboration in their main profile windows 200 and such networks do exist in the neighbourhood. In other words, a user must consent by providing his contact details together with the car-registration number, in case he/she wants to be contacted by a stranger in a spontaneous way using the vehicle registration number. This often involves registering the mobile number or any other contact detail such as MSN ID, Skype ID, landline telephone number, satellite telephone (e.g., IntelSat, Inmarsat and the like) number and the like—which is not available to other users, but only the client module 140 of users manipulate such personal information. The client module 140 will liaise with the server application 28 in order to gather the appropriate contact detail of the callee, makes the necessary underlying communication set up when the caller enters the vehicle registration number of the callee and initiate voice/video call, multimedia chatting 110, VoIP call, multiplayer online gaming 112 and the like. It is also possible for users to use the hardware facilities available on the handheld devices of other collaborating users. For instance, user A can make use of pico-projector or camera of user B, as long as user B agrees to such a sharing.

Evolving web 2.0 technologies namely Mashups, Widgets, Gadgets, Web Services Invocation Framework (WSIF) [12] along with other similar or different future technologies can be used for the envisaged service invocation 160. These implementation specific details are, however, not within the scope of this patent.

6) Session Continuity Using SIP/XMPP Features 150

In the envisaged application scenarios, unless the Mobi_HobNob client module 140 ensures session continuity, there is a possibility for a multimedia session to be interrupted or terminated when users move away from each other such that they are not within each other's range pertaining to the communication interface of first type. Hence, in order to provide uninterrupted services to the user, there is a need to ensure session continuity through seamless handover perhaps via the communication interface of second type in the case of multimedia communication sessions such as voice and video calls, video conferencing, streaming multimedia distribution, instant messaging, presence information and online games.

The issue of seamless handover is best solved at the application layer, and there are several reasons for this. First, it is desirable to have the possibility to make local solutions. SIP is the most flexible and best suited basis for making a seamless handover, and to maintain sessions during link breakage. Due to its network independent quality, and also that it is independent of operator, a SIP-based solution will work over any present or future IP-network, and thus should be well suited for a heterogeneous network environment. For these reasons, the Mobi_HobNob client module 140 is Session Initiation Protocol (SIP) and its extension called Session Initiation Protocol for Instant Messaging and Presence Leveraging Extensions (SIMPLE) enabled. However, in the future it may use different protocols to ensure session continuity, and the use of XMPP is also not ruled out. Hence, the aim of the proposed methodology, the system or the secure spontaneous collaboration framework 10 of the present invention is to ensure session continuity 150 even if the users move apart—this again depends on the user settings. In case a user prefers session continuity, session handovers are inevitable from ad hoc network 14 that uses the communication interface of first type to an infrastructure-based network 18 that uses the communication interface of second type or vice-versa. As mentioned before, by the term ad hoc network 14, this patent means a peer-to-peer network that is formed without relying on any infra-structure and it is analogous to MANET.

The difference in handling mobility in a homogeneous system like GSM, and in heterogeneous network environment, where co-existence of different varieties of networks is possible, like the one envisaged by the proposed methodology, the system or the secure spontaneous collaboration framework 10 of the present invention is that the latter lack a common mobility management system. During a change of network interface on a terminal which is often probable in heterogeneous network environment, it is not possible to maintain the session since the session is associated with an IP-address on an interface. The session will then have to be re-initiated, using the new interface. In other words, a session that is originated when the users spontaneously collaborate in an ad hoc mode using the communication interface of first type while being within each other's range has to continue using the communication interface of second type being supported by different infra-structure-based network 18 at the users' discretion even when the users move away from each other. This process can involve changing addresses.

The URI of each user uses the preferred username as entered into by every user at the time of Mobi_HobNob registration as shown in 200 of FIG. 4, and for this purpose each user has to choose a unique username. Accordingly, the URI of each registered user is of the following form: <preferred username>@Mobi_HobNob.com. As part of this arrangement, the Mobi_HobNob central server 24 and the associated database 22 have key SIP server functionalities, namely the registration server. As explained before, the Mobi_HobNob client module 140 and the server application 28 use the Profile-ID to identify each user and hence the URI is bound to the Profile-ID of each user. The Mobi_HobNob client module 140 consists of at least two SIP stacks per a User Agent (UA) 1602 as shown in 1600 of FIG. 18 to facilitate seamless session continuity—one is for the ad hoc network 14 and the other is for any of the infra-structure-based networks 18, and both uses the same Call-ID. The client module 140 that operates in a centralised mode or can periodically communicate with the server application 28 via any infra-structure-based network 18 is pre-requisite if a session is to continue from an ad hoc network 14 to any of the infra-structure-based networks 18.

Given that SIP is a peer-to-peer protocol and hence does not rely on any infra-structure for it to work, as depicted in 1600 of FIG. 18 one SIP stack 1604 (say, SIP1 of User Agent A) directly interacts with that of another user (say, SIP 3 of User Agent B) in the pure ad hoc network 14. The corresponding data tunnel is also established directly between the two nodes without relying on any infra-structure. On the other hand, the other SIP stack 1608 of a user agent 1602 connects to that of another user via the Internet cloud 20, and hence uses an infra-structure-based network 18. The corresponding data tunnel is also established via any of the infra-structure-based networks 18. Please note that although two data tunnels are established—one via the ad hoc network 14 and one via any of the infra-structure-based networks 18—the user agent 1602 will use only one at a time. In other words, one data tunnel is active whereas the other one is passive and hence is in a standby mode (i.e., a backup). The selection of the tunnels depends on which SIP stack is active at a given instance. Since it is better not to set up a backup tunnel before the user agent A knows that the session it initiates will be accepted by the user agent B of the other user, user agent A will wait for the 200/OK response, to confirm that the session is accepted. At this time, a new INVITE request is created, using the IP-address assigned to a different network interface by any of the infra-structure-based networks 18. In this request, the media attribute 'a' is set to send-only in Session Description Protocol (SDP), to indicate that the new session is supposed to be set directly on hold.

Consider a case when a handover needs to take place from a pure a hoc network 14 to one of the infra-structure-based networks 18. When a session is established via an ad hoc network 14, one SIP stack of an UA 1602 will be active, while the other remains passive after having performed the necessary user registration and data tunnel establishment. In other words, one SIP-stack performs the signaling for the active session, whereas the other SIP-stack is used for the passive session. In order to ensure session continuity across heterogeneous networks, the handover from an ad hoc network 14 to any of the infra-structure-based networks 18 should be seamless and performed in a proactive manner. Accordingly, the handover should be initiated due to either a graceful degradation of the link, or a sudden link breakage, i.e., not planned handover. Given that signal strength measuring and link breakage detection are normally handled at the physical layer and/or link-layer, the Mobi_HobNob client module 140 shall be notified by the physical layer and/or link-layer.

As it is shown by the flowchart 1700 in FIG. 18, when the session is initiated in the ad hoc network 14, depending on the user settings (for instance, if the user prefers a session continuity 1704), a backup session will also be setup if any infra-structure-based network 18 exists. Once the session is active, the Mobi_HobNob client module 140 will periodically take the necessary physical layer and/or link-level measurement 1710 and see whether the handover is necessary 1712. In case the signal level go below a given threshold, the Mobi_HobNob client module 140 running on the handheld 12 device that noticed this signal behaviour first will inform the UA 1602 and let it send a re-INVITE over the backup path. The UA 1602 and the Mobi_HobNob client module 140 running on other end will be informed about the handover through the SDP and that the Real Time Protocol (RTP) packets are to be duplicated for a given time. The original path is kept open, and the packet stream is sent over both network interfaces. If it is an interactive multimedia session, packet needs to be duplicated at one side and filtered at the other side. This requires that the User Agent 1602 synchronize the two packet streams before the first path breaks, and thus achieve a perfect seamless handover.

Once handed over to any of the infra-structure-based networks 18, the Mobi_HobNob client module 140 will periodically check to see whether the two communicating parties happen to be close to each other (i.e., each other's radio range). If they happen to be, handover will take place from the infra-structure-based network 18 to the ad hoc network 14 in a similar way. This is again performed at the user discretion, and before the actual handover the Mobi_HobNob client module 140 needs to take periodic measurements in the ad hoc network 14 to ensure that the signal quality is good enough to support the multimedia application. If this is ensured, then seamless handover can take place.

Although SIP-based handover session continuity mechanism is presented here, a handover from 14 that uses packet switched networking principles to 16 that uses circuit switched communication is also possible. This is a case when devices 12 that initially used the communication interface of first type for spontaneous collaboration need to communicate via the communication interface of second type, where the second interface is supported by a circuit switched network (e.g., GSM/3G). In this case, a new communication session needs to be established via a communication interface of second type before the communication session that takes place currently via the communication interface of first type is terminated. The client module 140 running in either device 12 will communicate with the server application 28 in order to retrieve the required contact detail of either party such as the mobile telephone number, satellite telephone (e.g., IntelSat, Inmarsat and the like) number and the like, establish the session on communication interface of second type and let the spontaneous collaboration continue. This is possible only when the users have agreed to this arrangement and hence such session continuity is performed without jeopardising their privacy settings. The unique feature is that the parties to the communication need not know the contact details of either party as the underlying communication session establishment is handled by the client module 140 running in each device 12 and the server application 28.

SIMPLE or Extensible Messaging and Presence Protocol (XMPP) can be used in a similar way (i.e., two stack model) to ensure continuity of Instant Messaging and Presence Service (IMPS).

While example embodiments and applications have been illustrated and described, it is to be understood that the invention is not limited to the precise configurations and resources described above. Various modifications, changes, and variations apparent to those skilled in the art may be made in the arrangement, operation, and details of the scope of the claimed invention.

It is to be appreciated that the foregoing detailed description is made for information purposes only, and is not meant to limit the scope of the present invention as set out in the accompanying claims.

References:

[1]. P. Basu, "A Task-Based Approach for Modeling Distributed Applications on Mobile Ad hoc Networks," Ph.D. thesis, Boston University, Boston, Mass., May 2003.

[2]. S. Sivavakeesar, G. Pavlou, Rate Allocation and Buffer Management for Proportional Service Differentiation in Location-Aided Mobile Ad Hoc Networks, Proc. of the 3rd International Conference on Wired/Wireless Internet Communications (WWIC'2005), Greece, pp. 97-106, Springer, May 2005

[3]. Y. Yuan, and W. Arbaugh, "A Secure Service Discovery Protocol for MANETs," Proc. IEEE Symp. Pers., Indoor and Mobile Radio Communications, September 2003, pp. 502-06.

[4]. U. C. Kozat and L. Tassiulas, "Network Layer Support for Service Discovery in Mobile Ad Hoc Networks," Proc. IEEE INFOCOM, vol. 22, no. 1, March 2003, pp. 1965-75.

[5]. H. Koubaa and E. Fleury, "A Fully Distributed Mediator Based Service Location Protocol in Ad Hoc Networks," Proc. IEEE GLOBECOM, November 2001, pp. 2949-53.

[6]. C. Lee et al., "Konark: A System and Protocols for Device Independent, Peer-to-Peer Discovery and Delivery of Mobile Services," IEEE Trans. Sys., Man, and Cybernetics, vol. 33, no. 6, November 2003, pp. 682-96.

[7]. F. Yu, and V. C. M. Leung, "Mobility-Based Predictive Call Admission Control and Bandwidth Reservation in Wireless Cellular Networks", IEEE INFOCOM, 2001, pp. 518-526.

[8]. S. Sivavakeesar, "Quality of Service Support for Multimedia Applications in Mobile Ad Hoc Networks—A Cross-Layered Approach", PhD Thesis, University of Surrey, December 2005.

[9]. P. Calhoun, J. Loughney, E. Guttman, G. Zorn and J. Arkko, "Diameter Base Protocol", RFC 3588, September 2003.

[10]. H. Hakala, L. Mattila, J-P. Koskinen, M. Stura, and J. Loughney, "Diameter Credit-Control Application", RFC 4006, August 2005.

[11]. Zero Configuration Networking (zeroconf), http://www.zeroconf.org/zeroconf-charter.html.

[12]. M. J. Duftler et al, Web services invocation framework, http://www.research.ibm.com/people/b/bth/OOWS2001/duftler.pdf. OOPSLA Workshop on Object Oriented Web Services, August 2001.

[13]. Jini, www.jini.org

The invention claimed is:

1. A secure spontaneous collaboration system comprising:
   i) two or more users; each possessing a handheld mobile communication and computing device and each handheld device having software and hardware capabilities allowing users to spontaneously collaborate with each other;
   ii) a centralised server possessing software and hardware capabilities to store user-specific information and applications and services enabling spontaneous collaboration among two more users with their handheld devices; and,
   iii) an infra-structure-based communication network allowing the said handheld device to maintain necessary communication with the said centralised server via a communication interface of second type; the said secure spontaneous collaboration system characterised in that:
      each handheld device supports a communication interface of a first type to spontaneously collaborate with each other in a peer-to-peer manner without relying on any infra-structure- based network;
      each handheld device supporting the said communication interface of a second type for the purpose of communicating with the said centralised server and such communication with a centralised server can happen prior to or simultaneously during any spontaneous collaboration;
      each user specifying user preference in terms of whether any communication with a centralised server is preferred using the communication interface of the second type;
      wherein the said secure spontaneous collaboration system enables each handheld device to employ an operating mode selection procedure to choose the appropriate operating mode out of three different modes, taking into consideration the said user preference in terms of centralised server connectivity and congestion on the communication interface of the first type and the three different operating modes including:
   a) Fully distributed operating mode, where all handheld devices communicate with each other using the communication interface of the first type without requiring each handheld device to have any interaction with the said centralised server using the communication interface of the second type;
   b) Semi-distributed operating mode, where each of said handheld devices spontaneously collaborate with each other using the said communication interface of the first type while requiring each handheld device to have any interaction with the said centralised server using the communication interface of the second type mainly prior to any spontaneous collaboration; and
   c) Centralised operating mode, where each of said handheld devices spontaneously collaborate with each other using the said communication interface of the first type while requiring each handheld device to have any interaction with the said centralised server using the communication interface of the second type mainly during any spontaneous collaboration.

2. The secure spontaneous collaboration system according to claim 1 characterised in that the said centralised server is configured to possess one or plurality of centralised databases and handheld devices is configured to possess one or plurality of local databases, wherein the said handheld devices adopting the said operating mode selection procedure comprising the steps of:
   1) Sniffing all the available radio channels being used to provide the communication interface of first type and measuring the congestion-level of the least congested channel;
   2) deciding whether the current congestion-level is suitable for the fully distributed mode that has no reliance on any infra-structure network, and if so, choosing the fully distributed mode;
   3) on the other hand, if the congestion level is too high for the fully distributed mode further checking whether the congestion level is suitable for at least the semi-distributed or centralised modes and if the said local database in the handheld device is up-to-date with the said centralised database, choosing semi-distributed mode or otherwise if infra-structure-based connection is preferred by the user, then choosing the centralised mode; and,
   4) on the other hand, the congestion is too high for any mode to operate satisfactorily aborting the operation,
   wherein the said operating mode selection procedure adopts one of three modes of operation to suit the handheld device capabilities, user preferences in terms of connecting to any infra-structure-based network and dynamic load conditions of the network to be formed.

3. The secure spontaneous collaboration system according to claim 1, wherein the communication interface of first type is any of the short-range radio communication technologies enabling total peer-to-peer communication among the said handheld devices while requiring no infra-structure-based network that are both available to date such as WiFi and WiFi-direct, Bluetooth, ZigBee, WiMedia UWB, Infra Red (IR) and any similar future technologies and the communication interface of second type is the main air interface of existing and/or future infra-structure-based cellular/wireless technologies such as GPRS, 3G, LTE/LTE-A, WiMAX, WLAN and the like.

4. The secure spontaneous collaboration system of claim 1, wherein the handheld device establishes spontaneous collaboration with one or many handheld devices by adopting a sequence comprising the steps of:
   1). Operating mode selection using the said operating mode selection procedure governing whether each of said handheld device/user will first connect to other like-minded handheld devices/users using the communication interface of first type while having or not having any communication with a centralised server prior to or during any spontaneous collaboration using the communication interface of second type;
   2). Triggering periodic packet dissemination and executing service/peer discovery process allowing each user or handheld device to identify like-minded users/devices in a local neighbourhood for any spontaneous collaboration;
   3). Users or handheld devices mutually authenticating each other before enlisting the right like-minded individuals for possible collaboration;
   4). Auto-configuring each handheld device chosen after successful mutual authentication to form a task-centric network for spontaneous collaboration on the said communication interface of first type;
   5). Enabling encryption on communication interface of first type for communication within the formed task-centric network and allowing automatic or manual service invocation;
   wherein the said sequence helping a handheld device systematically establish spontaneous collaboration while considering user preferences in terms of employing the said communication interface of second type and ensuring user security and privacy.

5. The secure spontaneous collaboration system of claim 4, wherein the said handheld device adopting the said sequence to establish spontaneous collaboration with one or many handheld devices further performing a step comprising:
   automatic session continuation procedure allowing a user or a handheld device to maintain connectivity with a formed task-centric network either using the communication interface of first type or communication interface of second type depending on how far a user has physically moved from the formed task-centric network, user preference and operating mode chosen.

6. The secure spontaneous collaboration system of claim 1 characterised in that a said handheld device triggering periodic packet dissemination for the purpose of establishing spontaneous collaboration with one or many handheld devices by adopting the said sequence, wherein the said handheld device varying the contents and usage of the periodic packet dissemination depending on whether the user or handheld device is still in a discovery mode or a desired spontaneous collaboration is already fully established.

7. The secure spontaneous collaboration system of claim 6 characterised in that a said handheld device triggering periodic packet dissemination for the purpose of establishing spontaneous collaboration with one or many handheld devices by adopting the said sequence, wherein each handheld device trying to explore the local neighbourhood to find out the existence of like-minded users by attempting service discovery on different variants of the said communication interface of first type to increase the success rate because different handheld devices in the local neighbourhood may use different variants of the communication interface of first type.

8. The secure spontaneous collaboration system of claim 6 characterised in that the said centralised server is configured to operate an Public Key Infrastructure (PKI) and to allow each user of a handheld device to create and maintain one or plurality of different categories of profiles in the said centralised database or the said local database pertaining to different applications or services enabling spontaneous collaboration with other like-minded users, and this process requires:
   1) creation, activation and maintenance by every user of the mandatory main profile and one or a multitude of optional profiles per each of the said applications/services a user is interested in;
   2) on successful activation of the mandatory main profile, the said centralised server assigning a unique identifier and asymmetric security keys to each user that are indexed using the assigned unique identifier;
   wherein prior to any task-centric network formation, the said handheld device constructing the said periodic packet by including a unique identifier and private key pertaining to the originator/sender of a packet so that a receiver can authenticate a sender/originator of a packet using the public key fetched from the said centralised server using the unique identifier of an originator/sender found in the received packet.

9. The secure spontaneous collaboration system of claim 6, wherein prior to any task-centric network formation the said handheld device constructing the said periodic packet by including a service-list indicating the applications and services an originator/sender of a periodic packet is interested in and/or offers for neighbouring nodes to identify like-minded users/devices in the local neighbourhood, wherein this included service-list is preferably used as the main criteria of the subsequent service/peer/device discovery process.

10. The secure spontaneous collaboration system of claim 6, wherein prior to any task-centric network formation the said handheld device constructing the said periodic packet by including time-availability indicating how long a user of a handheld device will be available to spontaneously collaborate using a given application/service a user is interested in, wherein this time-availability value can be either server predicted or user entered and this included information is preferably used as the main criteria of the subsequent service/peer/device discovery process.

11. The secure spontaneous collaboration system of claim 6, wherein prior to any task-centric network formation the said handheld device constructing the said periodic packet by including operating mode preferred by an originator/sender of a packet, wherein this included information is preferably used as the main criteria of the subsequent service/peer/device discovery process.

12. The secure spontaneous collaboration system of claim 6, wherein the said handheld device constructing the said periodic packet by including an indication in terms of how many more peer users/devices are required for the desired spontaneous collaboration using a given application/service, wherein this included information is preferably used as the main criteria of the subsequent service/peer/device discovery process.

13. The secure spontaneous collaboration system of claim 6, wherein the said handheld device constructing the said periodic packet by including an online status indicating the availability of a user of a handheld device for a spontaneous collaboration to other neighbours, wherein this included information is preferably used as the main criteria of the subsequent service/peer/device discovery process.

14. The secure spontaneous collaboration system of claim 4 characterised in that the said sequence being adopted by a handheld device to establish spontaneous collaboration with one or many handheld devices, wherein the said auto-configuring of each handheld device chosen after successful mutual authentication to form a task-centric network for spontaneous collaboration on the said communication interface of first type in case of semi-distributed or centralised operating mode is in use, further requiring handheld devices to register their self-configured address with a centralised database together with a time stamp, wherein on detecting an address conflict, handheld devices to the conflict are further configured to resolve address based on usage time as indicated in one of the databases.

15. The secure spontaneous collaboration system of claim 4 characterised in that the said sequence being adopted by a handheld device to establish spontaneous collaboration with one or many handheld devices, wherein the said auto-configuring of each handheld device chosen after successful mutual authentication to form a task-centric network for spontaneous collaboration on the said communication interface of first type in case of fully distributed operating mode is in use, further requiring an address conflicting handheld device having the lower unique identifier than that of other parties to the address conflict to avoid address conflict by unilaterally choosing a different IP Address which is not currently in use in the local neighbourhood.

16. The secure spontaneous collaboration system of claim 4 characterised in that the said sequence being adopted by a handheld device to establish spontaneous collaboration with one or many handheld devices, wherein a handheld device incrementally learning non-default configuration details of a newly introduced service or application by either contacting a centralised server in case of centralised operating mode is chosen using the communication interface of second type or contacting the peer handheld device that has introduced the application or service in a peer-to-peer manner using the communication interface of first type through one or many query/response cycles in case of fully distributed or semi-distributed operating mode is chosen.

17. The secure spontaneous collaboration system of claim 4 characterised in that the said sequence being adopted by a handheld device to establish spontaneous collaboration with one or many handheld devices and once a task-centric is formed on demand to enable spontaneous collaboration among participating handheld devices/users using communication interface of first type, wherein the said handheld device ensuring multimedia session continuity by maintaining an active SIP-Stack and a passive SIP-Stack on the communication interface of first type and communication interface of second type respectively and whenever a handheld device/user moves away from a formed task-centric network such that a communication interface of first type can no longer be used to maintain connectivity, a hitherto passive SIP-Stack on the communication interface of second type will become active whereas the active SIP-Stack on the communication interface of first type will become passive provided a given user/device opts for centralised mode of operation.

18. A computer-implemented method for establishing secure spontaneous collaboration among two or more users; each possessing a handheld mobile communication and computing device and each handheld device having software and hardware capabilities allowing users to spontaneously collaborate with each other; the method further comprising:

enabling each said handheld device to communicate using the communication interface of a second type with a centralised server possessing software and hardware capabilities to store user-specific information and applications and services that can enable spontaneous collaboration among two more users with their handheld devices;

allowing each handheld device to support a communication interface of a first type to spontaneously collaborate with each other in a peer-to-peer manner without relying on any infra-structure-based network;

allowing each user to specify user preference in terms of whether any communication with a centralised server is preferred using the communication interface of the second type;

wherein the said computer-implemented method further enabling each handheld device to employ an operating mode selection procedure to choose the appropriate operating mode out of three different modes taking into consideration the said user preference in terms of centralised server connectivity and congestion on the communication interface of the first type and the three different operating modes including:
   a) Fully distributed operating mode, where all handheld devices communicate with each other using the communication interface of the first type without requiring each handheld device to have any interaction with the said centralised server using the communication interface of the second type;
   b) Semi-distributed operating mode, where each of said handheld devices spontaneously collaborate with each other using the said communication interface of the first type while requiring each handheld device to have any interaction with the said centralised server using the communication interface of the second type mainly prior to any spontaneous collaboration; and,
   c) Centralised operating mode approach, where each of said handheld devices spontaneously collaborate with each other using the said communication interface of the first type while requiring each handheld device to have any interaction with the said centralised server using the communication interface of the second type mainly during any spontaneous collaboration.

19. The computer-implemented method of claim 18, wherein establishing spontaneous collaboration with one or many handheld devices requiring each handheld device to adopt a sequence comprising the steps of:
   1). Operating mode selection using the said operating mode selection procedure governing whether each of said handheld device/user will first connect to other like-minded handheld devices/users using the communication interface of first type while having or not having any communication with a centralised server prior to or during any spontaneous collaboration using the communication interface of second type;
   2). Triggering periodic packet dissemination and executing service/peer discovery process allowing each user or handheld device to identify like-minded users/devices in a local neighbourhood for any spontaneous collaboration;
   3). Users or handheld devices mutually authenticating each other before enlisting the right like-minded individuals for possible collaboration;
   4). Auto-configuring each handheld device chosen after successful mutual authentication to form a task-centric network for spontaneous collaboration on the said communication interface of first type;
   5). Enabling encryption on communication interface of first type for communication within the formed task-centric network and allowing automatic or manual service invocation;
   Wherein the said sequence helping a handheld device systematically establish spontaneous collaboration while considering user preferences in terms of employing the said communication interface of second type and ensuring user security and privacy.

20. The computer-implemented method of claim 19, wherein the said sequence being adopted by the said handheld device to establish spontaneous collaboration with one or many handheld devices further comprising a step of:
   automatic session continuation procedure allowing a user or a handheld device to maintain connectivity with a formed task-centric network either using the communication interface of first type or communication interface of second type depending on how far a user has physically moved from the formed task-centric network, user preference and operating mode chosen.

21. The computer-implemented method of claim 18 characterised in that the said centralised server is configured to possess one or plurality of centralised databases and handheld devices is configured to possess one or plurality of local databases, wherein the said operating mode selection procedure being adopted by each handheld device comprising the steps of:
   1) Sniffing all the available radio channels being used to provide the communication interface of first type and measuring the congestion-level of the least congested channel;
   2) deciding whether the current congestion-level is suitable for the fully distributed mode that has no reliance on any infra-structure network, and if so, choosing the fully distributed mode subject to user preference;
   3) on the other hand, if the congestion level is too high for the fully distributed mode further checking whether the congestion level is suitable for at least the semi-distributed or centralised modes and if the said local database in the handheld device is up-to-date with the said centralised database, choosing semi-distributed mode subject to user preference or otherwise if infra-structure-based connection is preferred by the user, then choosing the centralised mode; and,
   4) on the other hand, the congestion is too high for any mode to operate satisfactorily aborting the operation,
   wherein the said operating mode selection procedure adopts one of three modes of operation to suit the handheld device capabilities, user preferences in terms of connecting to any infra-structure-based network and dynamic load conditions of the network to be formed.

22. The computer-implemented method of claim 18 characterised in that a said handheld device triggering periodic packet dissemination for the purpose of establishing spontaneous collaboration with one or many handheld devices by adopting the said sequence, wherein the said method requiring the said handheld device to vary the contents and usage of the periodic packet dissemination depending on whether the user or handheld device is still in a discovery mode or a desired spontaneous collaboration is already fully established.

23. The computer-implemented method of claim 22 characterised in that a said handheld device triggering periodic packet dissemination for the purpose of establishing spontaneous collaboration with one or many handheld devices by adopting the said sequence, wherein the said method requiring each handheld device to explore the local neighbourhood to find out the existence of like-minded users by attempting service discovery on different variants of the said communication interface of first type to increase the success rate because different handheld devices in the local neighbourhood may use different variants of the communication interface of first type.

24. The computer-implemented method of claim 22, wherein prior to any task-centric network formation the said method requiring each of the said handheld devices to construct the said periodic packet by including time-availability indicating how long a user of a handheld device will be available to spontaneously collaborate using a given application/service a user is interested in, wherein the said method further requiring this time-availability value to be either server predicted or user entered and this included information to be preferably used as the main criteria of the subsequent service/peer/device discovery process.

25. The computer-implemented method of claim 22, wherein prior to any task-centric network formation the said method requiring each of the said handheld devices to construct the said periodic packet by including operating mode preferred by an originator/sender of a packet, wherein the said method further requiring this included information to be preferably used as the main criteria of the subsequent service/peer/device discovery process.

26. The computer-implemented method of claim 22, wherein the said method requiring each of the said handheld devices to construct the said periodic packet by including an indication in terms of how many more peer users/devices are required for the desired spontaneous collaboration using a given application/service, wherein the said method further requiring this included information to be preferably used as the main criteria of the subsequent service/peer/device discovery process.

27. The computer-implemented method of claim 22, wherein the said method requiring each of the said handheld devices to construct the said periodic packet by including an online status indicating the availability of a user of a handheld device for a spontaneous collaboration to other neighbours, wherein the said method further requiring this included information to be preferably used as the main criteria of the subsequent service/peer/device discovery process.

28. The computer-implemented method of claim 20 characterised in that the said sequence being adopted by a handheld device to establish spontaneous collaboration with one or many handheld devices and once a task-centric is formed on demand to enable spontaneous collaboration among participating handheld devices/users using communication interface of first type, wherein the said method requiring each of the said handheld device to ensure multimedia session continuity by maintaining an active SIP-Stack and a passive SIP-Stack on the communication interface of first type and communication interface of second type respectively and whenever a handheld device/user moves away from a formed task-centric network such that a communication interface of first type can no longer be used to maintain connectivity, a hitherto passive SIP-Stack on the communication interface of second type will become active whereas the active SIP-Stack on the communication interface of first type will become passive provided a given user/device opts for centralised mode of operation.

29. The computer-implemented method of claim 20, wherein enabling secure and scalable on-the-fly inter-vehicle interaction facility between the first user and the second user who can be a total stranger to each other comprising the steps of:
1) getting both users to set up and activate the respective profiles specific to inter-vehicle interaction mechanism in the centralised server indicating the user preference and privacy settings for the inter-vehicle interaction facility after having registered the users' respective vehicle registration numbers;
2) subsequently getting both users inter-vehicle interaction application to synchronise their local database with the centralised database prior to any spontaneous collaboration; and,
wherein whenever the first user wants to interact with the unknown second user who currently travels/stays in his/her vehicle and the vehicle is currently located within the radio-range of the first user pertaining to the communication interface of first type, the first user can initiate any type of interaction with the second user by entering the vehicle registration number belonging to the second user in the appropriate UI provided by the said application as long as the privacy settings of the second user allows the first user to interact in the chosen way and the mutual authentication succeeds, and the computer-implemented method hides the underlying communication set up without divulging the said unique identifiers to each other and such interaction is possible by binding each user's unique identifier with his/her vehicle registration number, and, if needed, the said session continuity procedure will make attempts to maintain session continuity even when the users move out of each other's radio range as long as the users have the appropriate settings enabled.

\* \* \* \* \*